(12) United States Patent
Takata et al.

(10) Patent No.: US 8,073,851 B2
(45) Date of Patent: Dec. 6, 2011

(54) CONTENT SEARCHING DEVICE AND CONTENT SEARCHING METHOD

(75) Inventors: Kazutoyo Takata, Osaka (JP); Takashi Tsuzuki, Osaka (JP); Satoshi Matsuura, Kyoto (JP)

(73) Assignee: Panasonic Corporation, Osaka (JP)

( * ) Notice: Subject to any disclaimer, the term of this patent is extended or adjusted under 35 U.S.C. 154(b) by 60 days.

(21) Appl. No.: 12/672,085

(22) PCT Filed: Mar. 2, 2009

(86) PCT No.: PCT/JP2009/000926
§ 371 (c)(1),
(2), (4) Date: Feb. 4, 2010

(87) PCT Pub. No.: WO2009/113266
PCT Pub. Date: Sep. 17, 2009

(65) Prior Publication Data
US 2010/0293169 A1     Nov. 18, 2010

(30) Foreign Application Priority Data

Mar. 10, 2008  (JP) ................................. 2008-059914

(51) Int. Cl.
*G06F 7/00* (2006.01)
*G06F 17/30* (2006.01)
(52) U.S. Cl. ........................................ 707/739; 707/914
(58) Field of Classification Search .................. 707/737, 707/738, 739, 752, 913, 914, 999.107
See application file for complete search history.

(56) References Cited

U.S. PATENT DOCUMENTS

| | | | | |
|---|---|---|---|---|
| 2005/0120391 A1* | 6/2005 | Haynie et al. | ................. | 725/135 |
| 2005/0289599 A1* | 12/2005 | Matsuura et al. | ............... | 725/53 |
| 2006/0167918 A1* | 7/2006 | Tsuzuki et al. | ............... | 707/101 |
| 2006/0242191 A1 | 10/2006 | Kutsumi et al. | | |
| 2006/0271527 A1 | 11/2006 | Kutsumi et al. | | |

FOREIGN PATENT DOCUMENTS

| | | |
|---|---|---|
| JP | 5-307569 | 11/1993 |
| JP | 7-192009 | 7/1995 |
| JP | 10-232870 | 9/1998 |
| JP | 11-175530 | 7/1999 |

(Continued)

OTHER PUBLICATIONS

International Search Report issued Apr. 7, 2009 in International (PCT) Application No. PCT/JP2009/000926.

(Continued)

*Primary Examiner* — Marc Somers
(74) *Attorney, Agent, or Firm* — Wenderoth, Lind & Ponack, L.L.P.

(57) ABSTRACT

To provide a content searching device which can efficiently present to the user a topical related keyword.
A content searching device (100), which searches content from a content database with a use of a related keyword, includes: a related segment calculating unit (106) which calculates, for each content attribute, a related segment which is defined in order for first content and second content to be included in a same time segment, the related segment being calculated based on whether or not a degree of difference, for each content attribute, calculated out of a plurality of first keywords and a plurality of second keywords meets a predetermined reference value, the plurality of the first keywords each describing the first content to be stored in the content database (101), and the plurality of the second keywords each describing the second content having been stored in the content database (101); and a dictionary updating unit (107) which updates a degree of relevance stored in a dictionary database (102), the degree of relevance being updated with a use of the related segment, and the degree of relevance, among the plurality of keywords, being calculated for each content attribute.

10 Claims, 19 Drawing Sheets

FOREIGN PATENT DOCUMENTS

| | | |
|---|---|---|
| JP | 2000-242652 | 9/2000 |
| JP | 2001-216311 | 8/2001 |
| JP | 2002-183175 | 6/2002 |
| JP | 2004-318723 | 11/2004 |
| JP | 2007-188225 | 7/2007 |
| WO | 2005/066837 | 7/2005 |

OTHER PUBLICATIONS

Hidenori Homma, et al., "A Construction Method of a Metadata Space for an associative search utilizing the relation of each word in documents", The 16th Proceedings of Data Engineering Workshop (DEWS2005), 6A-o2, The Institute of Electronics, Information and Communication Engineers, 2005.

Takenobu Tokunaga, "Information Retrieval and Language Processing", University of Tokyo Press, 1999, pp. 60-65 (with partial English translation).

Kenji Kita, et al., "Information Retrieval Algorithm", Kyoritsu Shuppan Co., Ltd., 2002, pp. 60-63 (with partial English translation).

The Decision to Grant a Patent issued on Sep. 8, 2009 for the corresponding Japanese patent application No. 2009-528429.

* cited by examiner

FIG. 2

| Content ID (20) | Content attribute (21) | Title (22) | Airdate (23) | Keyword (24) | Summary (25) |
|---|---|---|---|---|---|
| 1 | Variety | Viva animals | 19:00, September 1, 2007 | Spider Crow Mammoth | From the crow to the mammoth |
| 2 | Sport | Fine goal | 21:00, September 1, 2007 | Soccer Feature Digest | Coming up is the digest of the soccer games we had last week···. |
| ... | ... | ... | ... | ... | ... |

| Content attribute 41 | Related segment 42 | Keyword 43 | Related keyword 44 | Degree of relevance 45 | |
|---|---|---|---|---|---|
| News | 2007/9/10 through 2007/9/12 | News | Autumn<br>The Diet<br>Soccer<br>... | 0.94<br>0.85<br>0.44<br>... | ⎫<br>⎬ Segment dictionary 31<br>⎭ |
| | | The Diet | Prime Minister's speech<br>Politics<br>Pension<br>... | 0.87<br>0.72<br>0.65<br>... | |
| | | Politics<br>... | ...<br>... | ...<br>... | |
| | 2007/9/1 through 2007/9/9 | News | Stock market crush<br>Track and field<br>Scandal<br>... | 0.94<br>0.85<br>0.44<br>... | ⎫<br>⎬ Segment dictionary 32<br>⎭ |
| | | The Diet | Call<br>America<br>Self Defense Forces<br>... | 0.87<br>0.72<br>0.65<br>... | |
| | | Politics<br>... | ...<br>... | ...<br>... | |
| | ... | | | | |

FIG. 8

| Initial search keywords | | | |
|---|---|---|---|
| · Sport | · Variety | · News | · Documentary |
| · Movie | · Music | · Hobby and culture | · Cartoon |

FIG. 9

"News"-related content
70

- News bulletins: From topics of the day to whether···.
- News TODAY : Here is more about the Diet which was called today···.
- Soccer news : Quick update of all the J-league soccer games···.

"News"-related keywords

71

2007/9/10 through
2007/9/12
· Autumn
· The Diet
· Soccer

2007/9/1 through
2007/9/9
· Stock market crush
· Track and field
· Scandal

2007/8/17 through
2007/8/31
· Summer vacation
· Sea
· Typhoon

Previous KW

"The Diet"-related content

- News TODAY : Here is more about the Diet which was called today…
- Sunday Documentary : Inside story of the Diet…
- Quiz - Social study : Politics quiz…

"The Diet"-related keywords

2007/9/10 through 2007/9/12
- Prime Minister's speech
- Politics
- Pensio

2007/9/1 through 2007/9/9
- Call
- America
- Self Defense Forces

2007/8/13 through 2007/8/31
- Election
- Dissolution
- Insurance premium

Previous KW

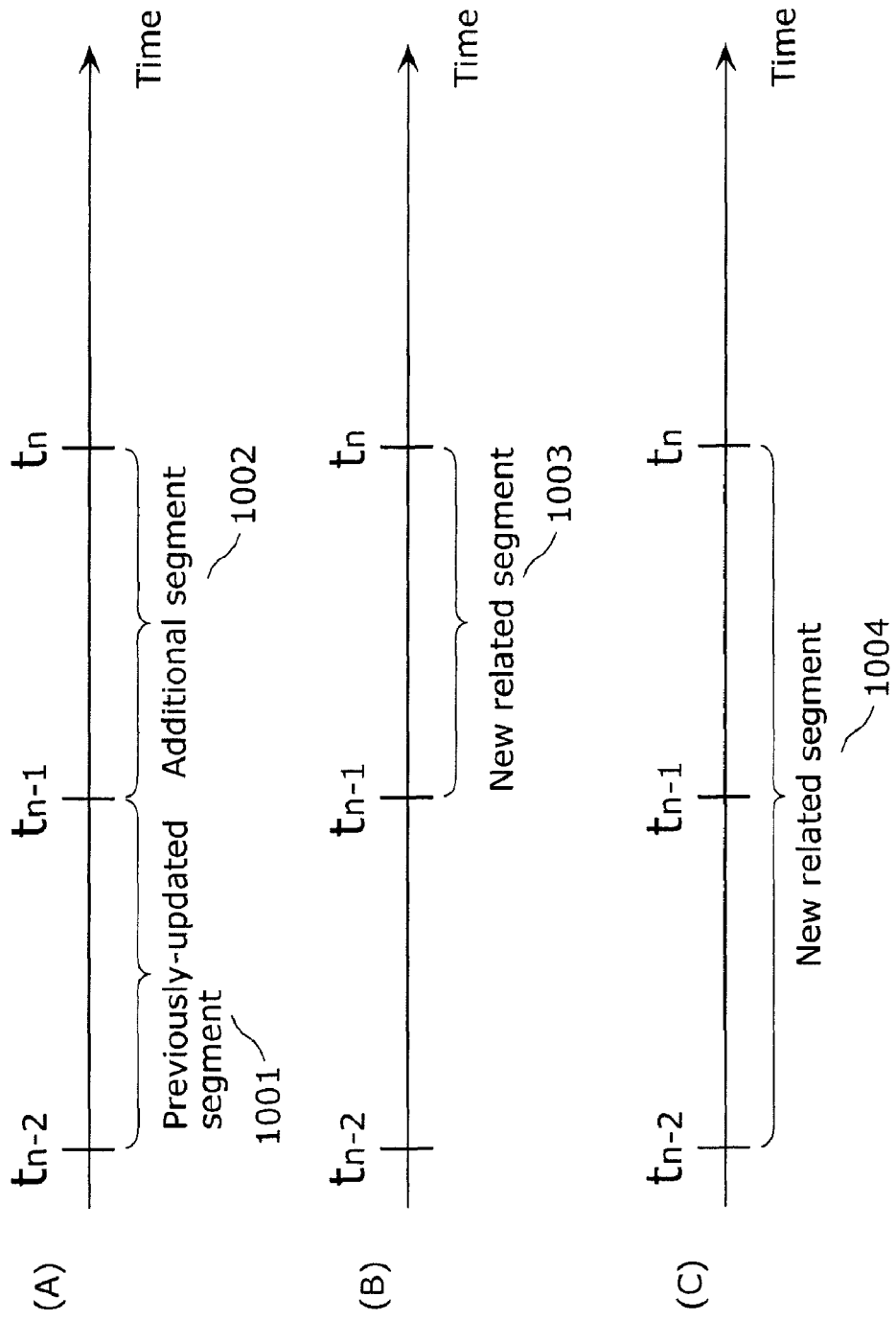

FIG. 13

"The Diet"-related content

- News TODAY : Here is more about the Diet which was called today···.
- Sunday Documentary : Inside story of the Diet···.
- Quiz – Social study : Politics quiz···.

"The Diet"-related keywords

■News-related

| 2007/9/10 through 2007/9/12 | 2007/9/1 through 2007/9/9 | 2007/8/13 through 2007/8/31 |
|---|---|---|
| · Prime Minister's speech | · Call | · Election |
| · Politics | · America | · Dissolution |
| · Pension | · Self Defense Forces | · Insurance premium |

Previous KW

■Variety-related

| 2007/7/01 through 2007/9/12 | 2007/4/1 through 2007/6/30 | 2007/1/1 through 2007/3/31 |
|---|---|---|
| · Quiz | · Debate | · Mimicking |
| · Hanako Matsushita | · Taro Matsushita | · Prime Minister |
| · School | · Jiro Matsushita | · Scandal |

Previous KW

FIG. 14
"The Diet"-related keywords
(A) Related keywords in accordance with conventional technique (fixed segment) (10 days)
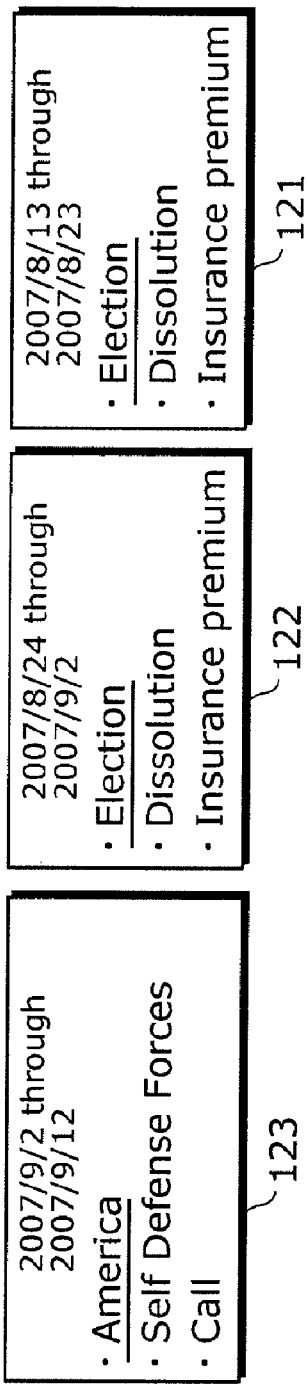
(B) Related keywords in accordance with proposed technique
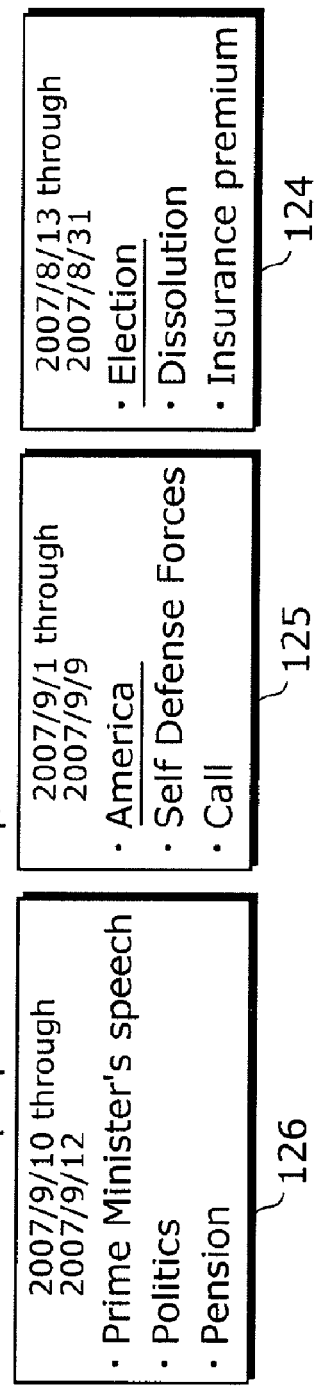

FIG. 18

Content ID

|  | C1 | C2 | C3 | C4 | C5 |
|---|---|---|---|---|---|
| KW1 | 1 | 0 | 0 | 1 | 0 |
| KW2 | 0 | 0 | 1 | 0 | 0 |
| KW3 | 1 | 0 | 0 | 0 | 0 |
| KW4 | 1 | 1 | 1 | 1 | 0 |
| KW5 | 0 | 1 | 0 | 0 | 1 |

Keyword

CONTENT SEARCHING DEVICE AND CONTENT SEARCHING METHOD

TECHNICAL FIELD

The present invention relates to a content searching device for searching a piece of content, which a user desires to use, out of pieces of content stored in large numbers.

BACKGROUND ART

In order to search a desired piece of content out of a large number of pieces of content stored in a server, several methods have been introduced for presenting plural related keywords from a searching device. Here, each of the related keywords is a word (keyword) which is related to a word specified by a user (keyword). A degree of relevance among mutually related keywords is typically calculated based on the number of co-occurrence times among the keywords and appearance frequency thereof.

Such a searching device updates relevancy among the keywords for presenting a related keyword, upon updating data of a content database in which content is stored (See Patent Reference 1, for example). Thus, the searching device presents to the user a related keyword based on a current content stored in the content database.

However, the related keyword, recalled by a specific keyword by the user, is different from user to user. For example, a user who has watched only a currently broadcasted drama on which an "actor A" appears recalls an "actress B" who has appeared on the drama as a related keyword. Meanwhile, another user who watched only a drama broadcasted one year ago with the "actor A" appeared on recalls an "actress C" who appeared on the drama as a related keyword. In the case where each user has different knowledge, as described above, the related keyword by which each user recalls the "actor A" is possibly different. In other words, when the searching device presents only a related keyword generated based on a current content, some users may find an un-recallable related keyword. The resulting problem is that the user cannot select a keyword, and thus cannot narrow down content.

One of conventional methods for solving the problem is to classify all pieces of content, stored in the content database, according to time segments of fixed times. This allows the searching device using the method in Patent Reference 2 to establish relevancy among keywords for each time segment. As a result, the searching device can present to the user a related keyword generated based on relevancy of a different time segment for each of several time segments. As a keyword which relates to the "actor A", for example, the searching device can simultaneously present to the user the "actress B" which has great relevance to a piece of content of this year and the "actress C" which has great relevance to another piece of content of the past year. As described above, the searching device presents the related keywords over several time segments, so that the user can select a related keyword to match with his or her knowledge. In other words, the user can efficiently narrow down pieces of content by repeating the selections of the related keyword.

Patent Reference 1: Japanese Unexamined Patent Application Publication No. 2007-188225
Patent Reference 2: Japanese Unexamined Patent Application Publication No. 2002-183175

DISCLOSURE OF INVENTION

Problems that Invention is to Solve

The conventional searching device using the method in Patent Reference 2, however, has a problem in that the searching device fails to present a related keyword incapable of coping with a change of a keyword line-up of each content since the searching device classifies all the pieces of content stored in the content database with a use of a time segment of a fixed time.

When the content database stores plural pieces of content each of which belongs to a different attribute (category), in general, the frequency of great changes in keyword line-up of the pieces of content is significantly different from attribute to attribute. Assume TV programs, for example. A news program sees a great change in keyword line-up at relatively short intervals. Meanwhile, a drama series sees a great change in keyword line-up no more than once every three months.

Described above is the case where included in the content database are pieces contents whose attributes are each different in frequency of great changes in keyword line-up. Here, when the conventional searching device determines a fixed time to match with a piece of content having less frequency in significant change of the keyword line-up, the searching device cannot present a topical related keyword which conforms to significantly changing frequency of the keyword line-up of each of attribute. For example, content of the "news category" having greater frequency in significant change of the keyword line-up assumes to see a change of keywords in the order of "the Diet", "soccer", and "typhoon" in a specific period. Here, the keywords have a high degree of relevance to a keyword "topic". Here, based on content of the "drama category" which has less frequency in significant change of the keyword line-up, the conventional searching device determines a fixed time, so that the above specific period is included one of the time segments. As a result, unfortunately, the related keyword to be presented out of "the Diet", "soccer", and "typhoon" is a keyword having the greatest degree of relevance to the "topic". In other words, "the Diet" or "soccer" is possibly presented instead of "typhoon"; that is, the most topical related keyword to "topic".

Meanwhile, when the conventional searching device determines a fixed time to match with a piece of content having greater frequency in significant change of the keyword line-up, the searching device presents a common related keyword over plural time segments. For example, when the conventional searching device determines a fixed time according to the content of the "news category", which frequently shows a significant change in keyword line-up, the searching device presents a common related keyword over plural time segments in the content of the "drama category" which has less frequency in significant change of the keyword line-up. Since the number of the keywords to be presented to the user by the searching device is limited, presenting the same keyword several times leads to fewer options for the user. As a result, unnecessary search steps may likely be developed in selecting a keyword by the user. In other words, the user cannot conduct efficient search of content on the conventional searching device.

The present invention is conceived in view of the above problems and has as an object to provide a content searching device which can efficiently present to the user a topical related keyword.

Means to Solve the Problems

In order to achieve the above object, an aspect of a content searching device in accordance with the present invention introduces a content searching device which (i) searches content from a content database with a use of a related keyword which is related to a keyword describing content, the content database storing the content for each content attribute showing a classification of the content, (ii) and includes: a dictionary database which stores a degree of relevance, among a plurality of keywords, for each related segment indicating a time segment, the plurality of keywords each describing the content which (i) belongs to the classification indicated by the content attribute, and (ii) is included in the related segment; a related segment calculating unit which calculates, for each content attribute, a related segment which is defined in order for first content and second content to be included in a same time segment, the related segment being calculated based on whether or not a degree of difference, for each content attribute, calculated out of a plurality of first keywords and a plurality of second keywords meets a predetermined reference value, the plurality of the first keywords each describing the first content to be stored in the content database, and the plurality of the second keywords each describing the second content having been stored in the content database; a dictionary updating unit which updates the degree of relevance, stored in the dictionary database, regarding the content included in the related segment calculated by the related segment calculating unit, the degree of relevance being updated with a use of the related segment, and the degree of relevance, among the plurality of keywords, being calculated for each content attribute; and an output generating unit which generates output information used for outputting, for each related segment, the related keyword relating to a keyword entered by a user, the output information being generated based on the degree of relevance stored in the dictionary database.

When searching a piece of content out of the content database storing mixed pieces of content each of which attribute has different frequency in change of a keyword line-up, the above structure allows the content searching device to efficiently present to the user a topical related keyword by updating the dictionary database according to the related segment calculated for each content attribute.

In the case of content including an attribute whose keyword line-up is great in significant change of frequency, specifically, the content searching device updates the dictionary database so that the time of the related segment of the attribute is shorter than that of a related segment of another attribute. This allows the content searching device to present a topical related keyword. Meanwhile, in the case of content including an attribute whose keyword line-up is little in significant change of frequency, the content searching device updates the dictionary database so that the related segment of the attribute is longer than that of another attribute in time. This allows the content searching device to avoid presenting the same keyword over several related segments; that is, the content searching device can efficiently present a keyword.

Further, when searching content out of a content database storing pieces of content each of which has an attribute whose keyword line-up periodically changes, the content searching device updates the dictionary database according to a related segment calculated based on the change of a keyword line-up of the content. This allows the content searching device to efficiently present a topical related keyword.

Specifically, when the keyword line-up changes in a short period, the content searching device updates the dictionary database so that the time of the related segment is shorter than that of another related segment. Meanwhile, when the keyword line-up changes in a long period, the content searching device updates the dictionary database so that the time of the related segment is longer than that of another related segment. This allows the content searching device to avoid presenting the same keyword over several related segments; that is, the content searching device can efficiently present a keyword.

In addition, the related segment calculating unit may calculate the related segment, regarding content included in the latest related segment stored in the dictionary database as the second content.

When content having a new time segment is added to the content database, this function involves determining a new related segment according to a degree of difference of a keyword line-up between the new time segment and a related segment calculated in previous updating. This allows the content searching device to efficiently present a topical related keyword.

Further, the related segment calculating unit may calculate the related segment according to whether or not a degree of difference meets the predetermined reference value, the degree of difference being calculated between (i) the predetermined number of keywords having high appearance frequency out of the plurality of the first keywords, and (ii) the predetermined number of keywords having high appearance frequency out of the plurality of the second keywords.

When content having a new time segment is added to the content database, this function allows the related segment calculating unit to calculate the degree of difference, regardless of the difference of the number of keywords: included in the new time segment and; included in the related segment calculated when the content is previously updated.

Moreover, the related segment calculating unit may calculate the related segment, regarding content included in a time segment in a predetermined time length as the second content, the time segment being included in time segments corresponding to content newly and previously added to the content database.

When content having a new time segment is added to the content database, this allows the content searching device to calculate the degree of difference of the keyword line-up between the latest content stored in the content database and the content newly added to the content database, regardless of the related segment calculated when the content is previously updated. Thus, the content searching device can present a more topical related keyword.

In addition, the content searching device may further include an attribute obtaining unit which obtains a content attribute which relates to the keyword entered by the user; and a related keyword obtaining unit which obtains, for each related segment, a related keyword with reference to the dictionary database, the related keyword corresponding to the keyword entered by the user and to the content attribute obtained by the attribute obtaining unit, wherein the output generating unit may generate the output information used for outputting the related keyword obtained by the related keyword obtaining unit.

This makes possible obtaining a content attribute with a use of the keyword entered by the user, which allows the content searching device to present a related keyword suitable for the user to enter.

Moreover, in the case where the attribute obtaining unit obtains a plurality of content attributes, the related keyword obtaining unit may generate the related keyword for each of the plurality of the content attributes, and the output generating unit may generate the output information used for outputting the related keyword generated for each of the plurality of content attributes, the output information being used for outputting the related keyword for each content attribute and for each related segment.

This makes possible simultaneously presenting to the user related keywords of plural content attributes, which allows the content searching device to present a related keyword of the user's desire.

Effects of the Invention

The present invention can efficiently present a topical related keyword in searching a desired piece of content from a content database storing pieces of content each of which content attribute has different frequency in significant change of a keyword line-up.

BRIEF DESCRIPTION OF DRAWINGS

FIG. 1 is a block diagram illustrating a functional structure of a content searching device in accordance with an embodiment of the present invention.

[FIG. 2] FIG. 2 exemplifies a content database.

FIG. 3 is a conceptual diagram of a related word dictionary.

[FIG. 4] FIG. 4 exemplifies the related word dictionary.

FIG. 5 is a flowchart illustrating a flow of processing in the content searching device.

FIG. 6 is a flowchart illustrating a flow of processing (Step S106 shown in FIG. 5) on calculation of elated segment performed by a related segment calculating unit.

FIG. 7 is a flowchart illustrating a flow of processing (Step S204 shown in FIG. 6) on calculation of a rate of change performed by the related segment calculating unit.

[FIG. 8] FIG. 8 exemplifies an initial searching screen.

[FIG. 9] FIG. 9 exemplifies a searching screen.

[FIG. 10] FIG. 10 exemplifies a searching screen.

[FIG. 11] FIGS. 11(A), 11(B), and 11(C) show a technique for calculating a related segment.

FIGS. 12(A) and 12(B) show a technique for calculating a related segment.

[FIG. 13] FIG. 13 exemplifies a presenting screen for related keywords in multi-attributes.

[FIG. 14] FIG. 14(A) is a presenting screen for related keywords provided by a content searching device in accordance with a conventional technique. FIG. 14(B) exemplifies a presenting screen for related keywords provided by the content searching device in accordance with the embodiment of the present invention.

FIG. 15 is a conceptual diagram showing generation of content attributes by a content database updating unit in accordance with Modification 1 of the present invention.

FIG. 16 shows generation of content attributes by a content database updating unit in accordance with Modification 1 of the present invention.

FIG. 17 is a flowchart illustrating a flow of processing (Step S106 shown in FIG. 5) on calculation of related segment performed by a related segment calculating unit in accordance with Modification 2 of the present invention.

[FIG. 18] FIG. 18 exemplifies a text matrix in accordance with Modification 2 of the present invention.

FIG. 19 illustrates obtainment of a text matrix in accordance with Modification 2 of the present invention.

NUMERICAL REFERENCES

Figure 1:
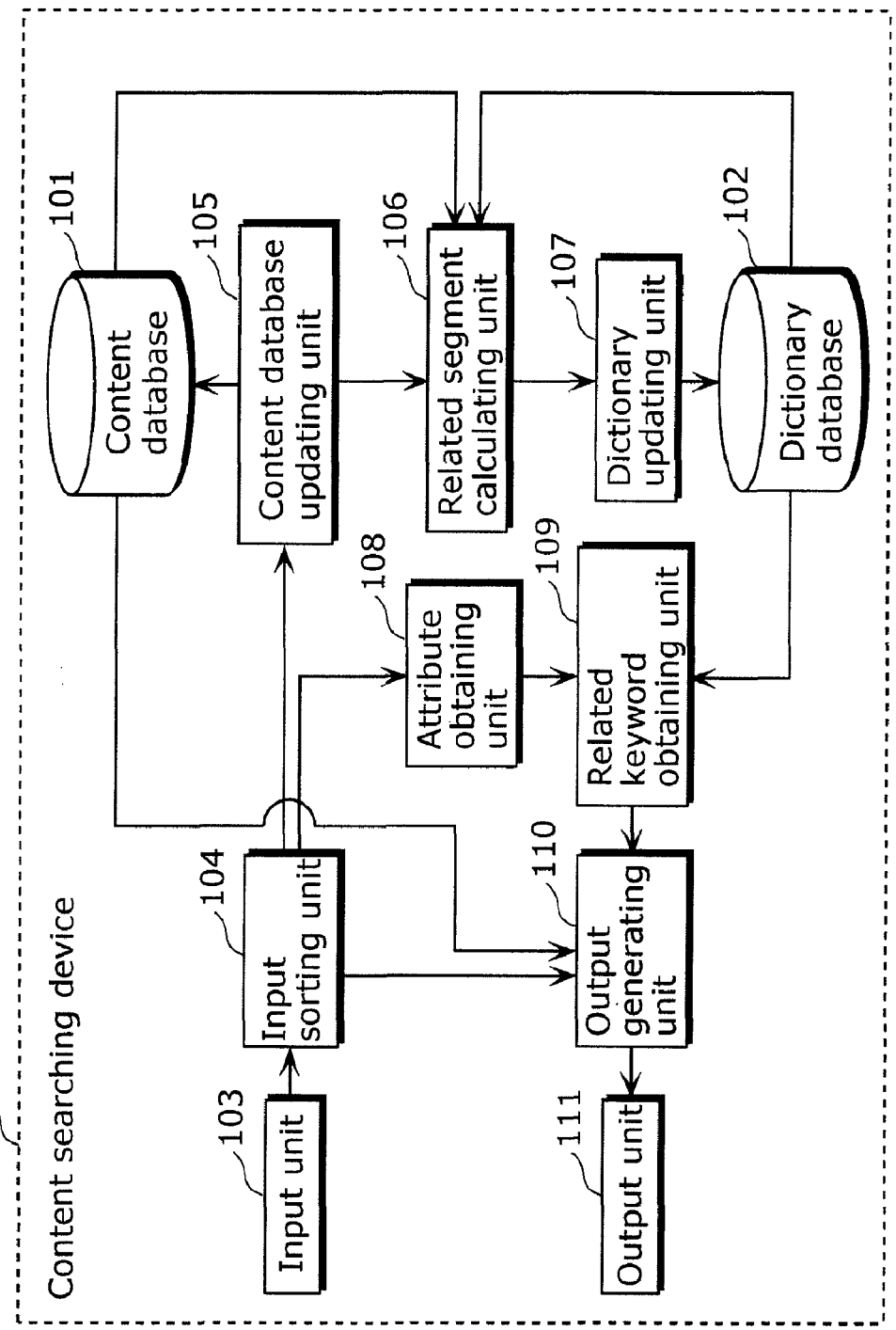
[FIG. 1]

20 Content ID
21 Content attribute
22 Title
23 Airdate
24 Keyword
25 Summary
31, 32 Segment dictionary
41 Content attribute
42 Related segment
43 Keyword
44 Related keyword
45 Degree of relevance
70 Content list
71 Related keyword list
100 Content searching device
101 Content database
102 Dictionary database
102a Related word dictionary
103 Input unit
104 Input sorting unit
105 Content database updating unit
106 Related segment calculating unit
107 Dictionary updating unit
108 Attribute obtaining unit
109 Related keyword obtaining unit
110 Output generating unit
111 Output unit
121, 122, 123, 124, 125, 126 Time segment
1001 Previously-updated segment
1002, 1102 Additional segment
1003, 1004 New related segment
1101 Segment of previously updated content
1103 Keyword comparison segment

BEST MODE FOR CARRYING OUT THE INVENTION

Described hereinafter is a content searching device in accordance with an embodiment of the present invention with reference to the drawings.

Embodiment

FIG. 1 is a block diagram illustrating a structure of a content searching device 100 in accordance with an embodiment of the present invention. As shown in FIG. 1, the content searching device 100 includes a content database 101, a dictionary database 102, an input unit 103, an input sorting unit 104, a content database updating unit 105, a related segment calculating unit 106, a dictionary updating unit 107, an attribute obtaining unit 108, a related keyword obtaining unit 109, an output generating unit 110, and an output unit 111.

Described hereinafter in order are details of each unit in the content searching device 100 shown in FIG. 1.

The content database 101 stores content such as a moving image, an image, music, and text to be searched, and attached information to content describing the content. Here, the attached information to content describes content, such as a keyword and a content attribute. It is noted that the content attribute is category information for classifying pieces of content. In the case of TV program content, for example, "category" described in the Electronic Program Guide (EPG) is the content attribute.

FIG. 2 exemplifies the attached information to content stored in the content database. The content database 101 stores the attached information to content including a content ID 20, a content attribute 21, a title 22, an airdate 23, a keyword 24, and a summary 25 shown in FIG. 2, as well as content such as a moving image. The airdate 23 exemplifies time information indicating information on a time of content. Here, the time information indicates a time regarding the content. It is noted that the time information does not necessarily represent an airdate; meanwhile, the time information may represent a date on which the content is registered at the content database 101. The keyword 24 shows a word (keyword) describing the content. In the keyword 24, for example, stored is a keyword attached to the EPG in advance. Further, in the keyword 24, stored may be a keyword extracted via executing a morphological analysis either on the title 22, or the summary 25.

The dictionary database 102 stores a degree of relevance among keywords stored in the content database 101. Specifically, for each content attribute for classifying the content and for each related segment indicating a time segment, the dictionary database 102 stores a related word dictionary 102a having a degree of relevance among keywords corresponding to a piece of content (i) of which time indicated in the time information is included in the related segment, and (ii) which belongs to a classification indicated in the content attribute. The related word dictionary 102a can store the degree of relevance among the keywords in the content attribute and among content attributes with a use of related segments each having a different length of time. It is noted that the related segment represents a time segment for calculating the degree of relevance among the keywords.

Figure 3:
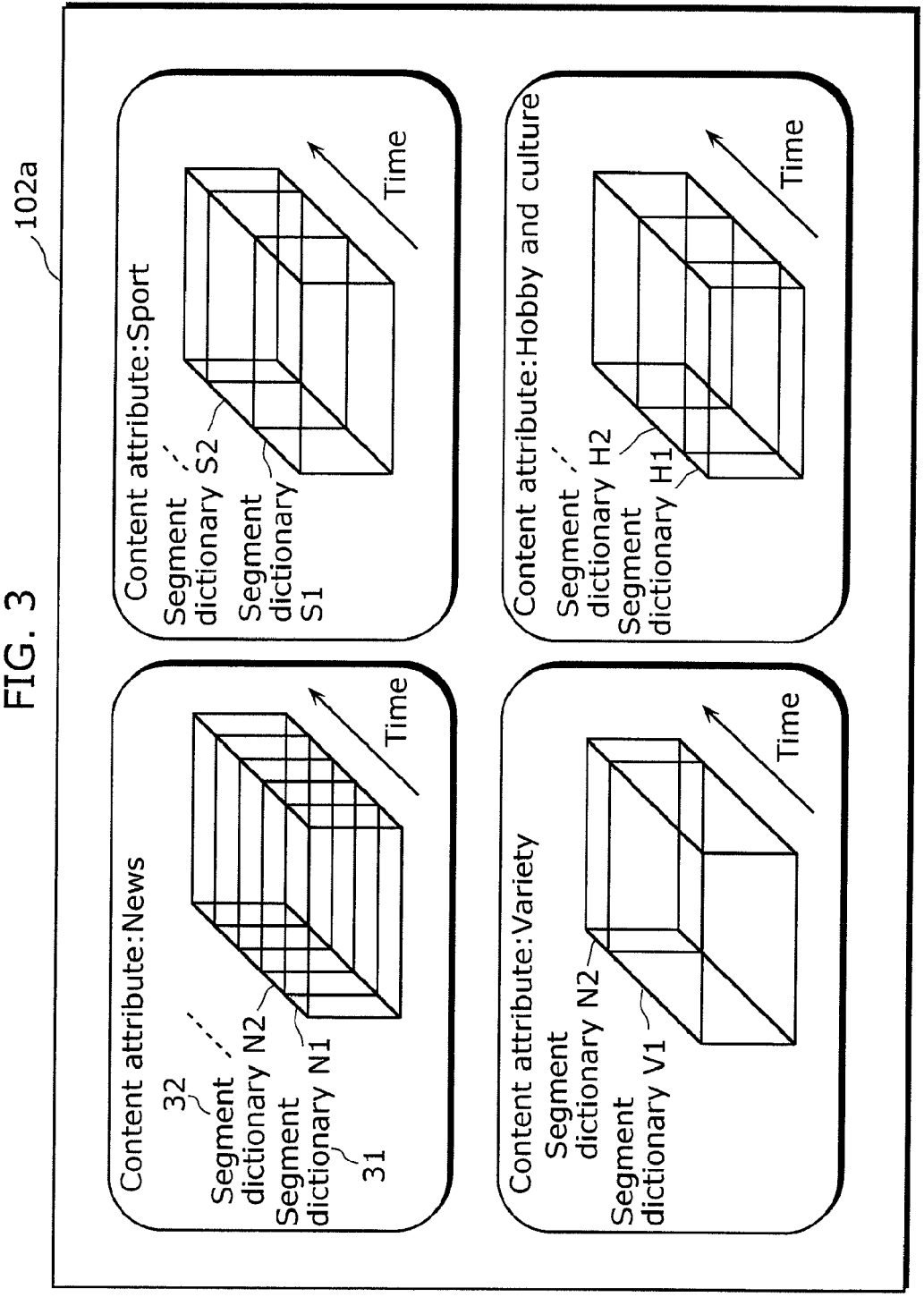
[FIG. 3]

FIG. 3 illustrates a conceptual diagram of the related word dictionary 102a in the case where four content attributes; namely "news", "sport", "variety", and "hobby and culture", are found in content stored in the content database 101. As shown in FIG. 3, the related word dictionary 102a is classified into four content attributes. Then, in each content attribute, segment dictionaries are stored. Each segment dictionary has a different related segment in time length, such as a segment dictionary 31 (N1) and a segment dictionary 32 (N2). Each of the related segments is different in time length for each content attribute ("news", "sport", "variety", and "hobby and culture").

FIG. 4 is an example of the related word dictionary 102a stored in the dictionary database 102. As shown in FIG. 4, the related word dictionary 102a includes a content attribute 41, a related segment 42, a keyword 43, a related keyword 44, and a degree of relevance 45. In the case where the content attribute 41 is "news", for example, "0.94" is the degree of relevance 45 of the related keyword 44 "autumn" related to the keyword 43 "news" included in the related segment 42 "Sep. 10, 2007 through Sep. 12, 2007". With reference to the related word dictionary 102a shown in FIG. 4, the related keyword obtaining unit 109 can obtain a related keyword to a keyword selected by the user.

The input unit 103 shown in FIG. 1 receives (i) operational input provided by the user and (ii) information on update of the content database, and notifies the input sorting unit 104 of the received information.

The input sorting unit 104 sorts the information provided from the input unit 103 into a piece of information indicating any of processing; that is, "keyword selection", "content selection", and "content database update". The selection technique shall be described hereinafter.

In the case where the input sorting unit 104 sorts out the information received from the input unit 103 as "content database update", the content database updating unit 105 updates the content and the attached information to content stored in the content database 101.

It is noted that the content database updating unit 105 copies all of data to be obtained, distributed by a content server, into the content database 101. In other words, all of data held before update is deleted once, and the newly obtained data is overwritten.

In the case where the present invention is used for recording a TV program, for example, the content database 101 on the device-side stores only the data held after an updated date due to a database attribute of the TV program (no data found before the airdate). Meanwhile, in the case of storage-type content, such as the Video on Demand (VOD), when content is deleted from a content server to include content to be obtained, the content stored in the content database 101 on the device-side is deleted.

When the content database updating unit 105 updates the content database 101, the related segment calculating unit 106 calculates a new related segment for each content attribute with reference to the content database 101 and the dictionary database 102. Specifically, the related segment calculating unit 106 calculates for each content attribute a degree of difference between (i) plural keywords (first keywords) describing content to be newly stored in the content database 101 (first content) and (ii) plural keywords (second keywords) describing content having been stored in the content database 101 (second content). Based on the fact whether or not the calculated degree of difference between the first and the second keywords meets a predetermined reference value, the related segment calculating unit 106 calculates a new related segment. In other words, a smaller degree of difference between the first and the second keywords causes the related segment calculating unit 106 to calculate a new related segment so that the first content and the second content can be more possibly included in the same time segment. Details of the related segment calculation technique shall be described hereinafter.

The dictionary updating unit 107 calculates a degree of relevance among keywords in content included in the new related segment calculated by the related segment calculating unit 106. Then, the dictionary updating unit 107 registers the degree of relevance of the calculated new related segment, along with the keywords and the related keywords, at the related word dictionary 102a. It is noted that the degree of relevance among the keywords is calculated based on a degree of co-occurrence of words (a degree of two words appearing simultaneously each other in the same content). Thus, a combination of keywords simultaneously appearing more frequently has a greater value of the degree of relevance. For example, the dictionary updating unit 107 calculates the degree of relevance among keywords, taking advantage of a technique described in Non-Patent Reference 1 "A Construction Method of a Metadata Space for an associative search utilizing the relation of each word in documents" (Hidenori HOMMA, et. Al., The 16$^{th}$ Proceedings of Data Engineering Workshop (DEWS2005), 6A-o2, The Institute of Electronics, Information and Communication Engineers, 2005).

In the case where the input sorting unit 104 sorts the information provided from the input unit 103 as "keyword selection", the attribute obtaining unit 108 obtains a content attribute of a keyword selected at the input unit 103 by the user. The determination technique of the content attribute shall be described hereinafter.

With reference to the related word dictionary 102a, the related keyword obtaining unit 109 obtains: the content attribute obtained by the attribute obtaining unit 108; and a related keyword and a degree of relevance corresponding to the keyword selected via the input unit 103 by the user.

When the input sorting unit 104 sorts the information provided from the input unit 103 as "keyword selection", the output generating unit 110 generates output information used for displaying the related keyword for each related segment according to the degree of relevance. Here, the related keyword is obtained by the related keyword obtaining unit 109. For example, the output generating unit 110 generates output information used for displaying related keywords in the order of high degrees of relevance. Moreover, for example, the output generating unit 110 may generate output information used for displaying a related keyword having a higher degree of relevance in larger characters. In addition, when the input sorting unit 104 sorts the information provided from the input unit 103 as "content selection", the output generating unit 110 generates output information used for displaying content of a broadcast program corresponding to the information which the user enters via the input unit 103.

The output unit 111 outputs the output information generated by the output generating unit 110 to an output medium. As the output medium, a TV monitor is used, for example.

Described next is an operation of the content searching device 100 structured above.

Figure 5:
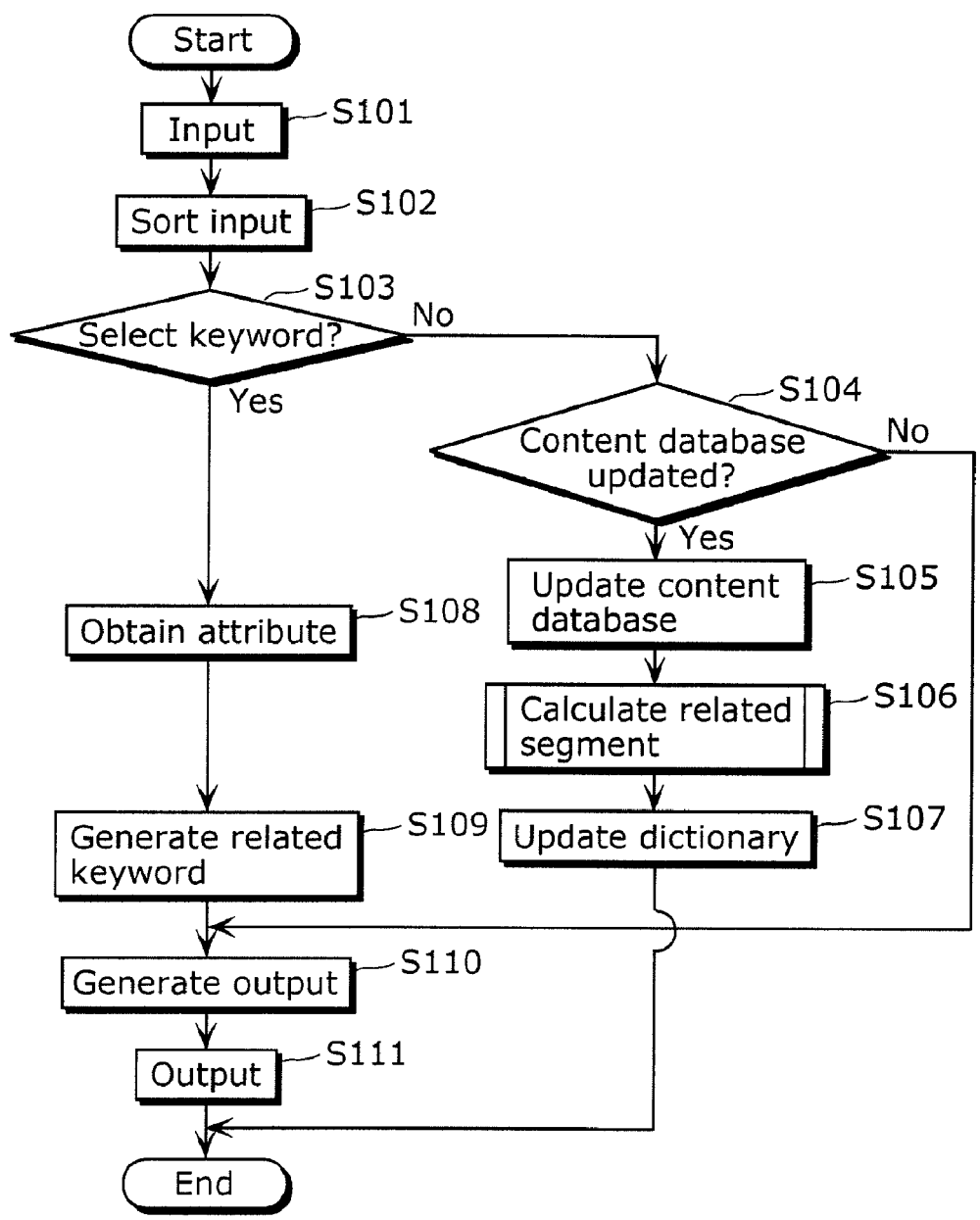
[FIG. 5]

FIG. 5 is a flowchart illustrating a flow of overall processing executed by the content searching device 100 shown in FIG. 1.

First, the input unit 103 receives the operational input provided by the user and notifies the input sorting unit 104 of the received information (Step S101). Next, the input sorting unit 104 sorts the information provided from the input unit 103 into a piece of information indicating any of processing; that is, "keyword selection", "content selection", and "content database update" (Step S102).

Here, in the case where the input sorting unit 104 sorts the information provided from the input unit 103 as "keyword selection" (Step S103: Yes), the attribute obtaining unit 108 obtains the keyword selected via the input unit 103 by the user and the content attribute of the keyword (Step S 108). Then, based on the obtained content attribute and the related word dictionary 102a, the related keyword obtaining unit 109 obtains the related keyword (Step S109). Next, the output generating unit 110 generates the output information used for providing the obtained related keyword (Step S110). Finally, the output unit 111 outputs the output information generated by the output generating unit 110 to the output medium, and the processing ends.

Meanwhile, in the case where the input sorting unit 104 does not sort the information provided from the input unit 103 as "keyword selection" (Step S103: No), the input sorting unit 104 determines whether or not the information provided from the input unit 103 is "database update" (Step S104).

When the input sorting unit 104 sorts the information provided from the input unit 103 as "database update" (Step S104: Yes), the content database updating unit 105 renews the content database 101 (Step S105). Then, the related segment calculating unit 106 calculates the related segment to be set in the related word dictionary 102a (Step S106). It is noted that a detailed processing flow of Step S106 shall be described hereinafter. Then, based on the calculated related segment, the dictionary updating unit 107 updates the related word dictionary 102a (Step S107), and the processing ends.

When the input sorting unit 104 does not sort the information provided from the input unit 103 as "database update" (Step S104: No); that is the input sorting unit 104 sorts the information as "content selection", the output generating unit 110 generates the output information used for displaying a broadcast program corresponding to the information which the user enters via the input unit 103 (Step S110). Finally, the output unit 111 outputs the output information generated by the output generating unit 110 to the output medium (Step S111), and the processing ends.

Figure 6:
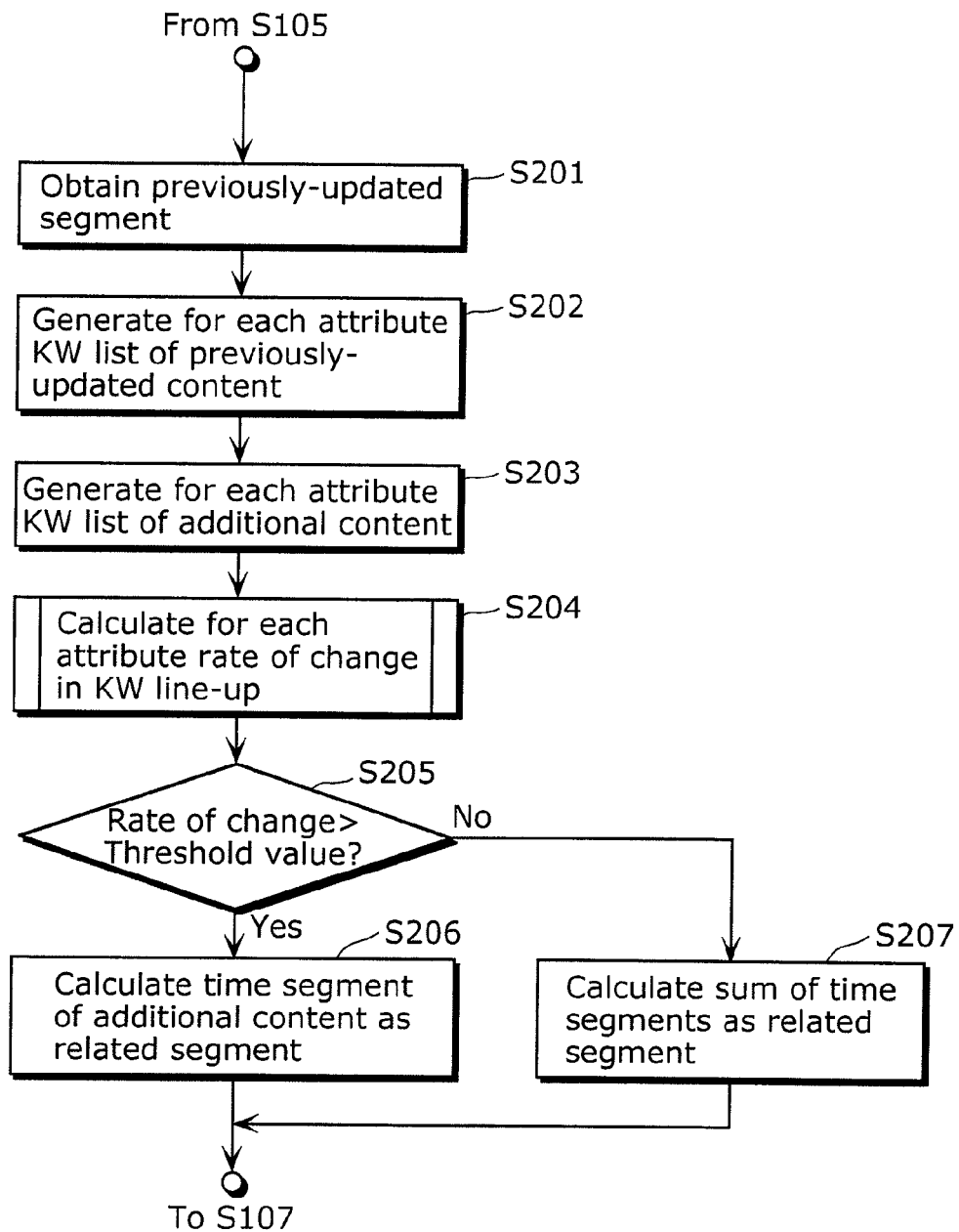
[FIG. 6]

FIG. 6 is a flowchart illustrating a flow of processing (Step S106 shown in FIG. 5) on calculation of the related segment performed by the related segment calculating unit 106.

First, the related segment calculating unit 106 obtains for each content attribute a previously-updated related segment (referred to as a previously-updated segment, hereinafter) in the related word dictionary 102a (Step S201). Next, the related segment calculating unit 106 generates for each content attribute a keyword list listing keywords included in the obtained previously-updated segment (Step S202). It is noted that the keywords included in the previously-updated segment correspond to the plural second keywords describing the second content stored in the content database 101. Then, the related segment calculating unit 106 obtains for each content attribute a keyword list listing keywords of content which is newly added to the content database 101 (Step S203). It is noted that the keywords included in the additional content correspond to the plural first keywords describing the first content stored in the content database 101.

Next, the related segment calculating unit 106 compares the keyword list generated in the Step S202 with the keyword list generated list in the Step S203 to calculate the rate of change in the keyword line-up (Step S204). It is noted that the rate of change in the keyword line-up is an example of the degree of difference.

Here, when the calculated rate of change exceeds a predetermined threshold value (Step S205: Yes), the related segment calculating unit 106 calculates as a new related segment a time segment corresponding to content which is newly added to the content database 101 (Step S206). In other words, the related segment calculating unit 106 calculates as a new related segment the time segment corresponding to the first content. It is noted that the time segment corresponding to the content is includes a time having time information on the content. In the case where content to be broadcasted on Sep. 10 and 11, 2007 is newly added to the content database 101, for example, the time segment corresponding to the content is Sep. 10 and 11, 2007.

Meanwhile, when the calculated rate of change is equal to the predetermined threshold value or below (Step S205: No), the related segment calculating unit 106 calculates as a new related segment a time segment which is the sum of the previously-updated segment and the time segment corresponding to the content to be newly added to the content database 101 (Step S207). In other words, the related segment calculating unit 106 calculates, as the new related segment, the time segment including (i) the time segment corresponding to the first content and (ii) the time segment corresponding to the second content. After the related segment calculating unit 106 calculates the related segment, the processing in the Step S107 shown in FIG. 5 is executed.

Figure 7:
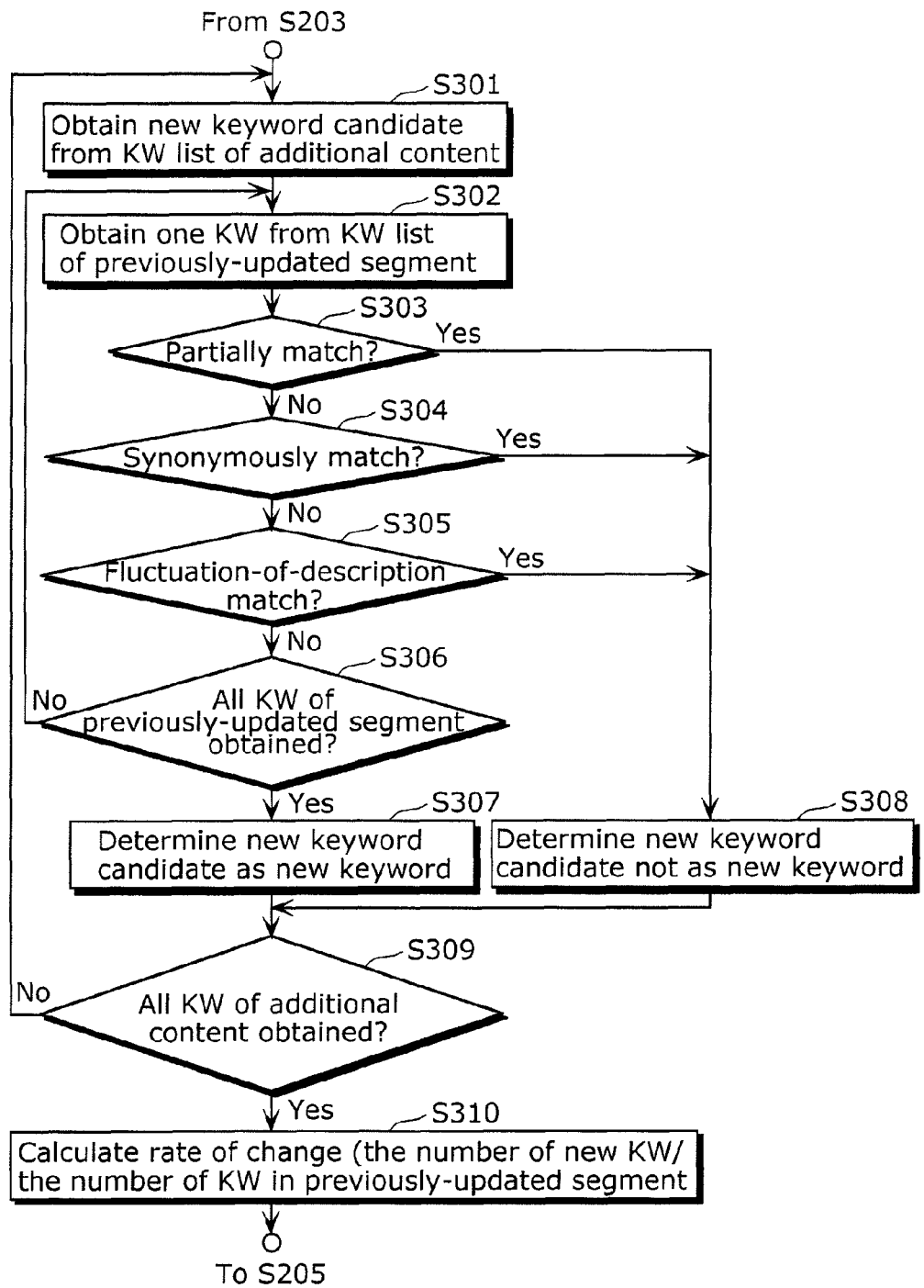
[FIG. 7]

FIG. 7 is a flowchart illustrating a flow of processing (Step S204 shown in FIG. 6) on calculation of the rate of change performed by the related segment calculating unit 106.

First, the related segment calculating unit 106 obtains, from the keyword list of the additional content generated in the Step S203, a keyword (new keyword candidate) which has not received the following processing (Steps S302 to S308) (Step S301). Further, the related segment calculating unit 106 obtains, from the keyword list of the previously-updated segment generated in the Step S202, a keyword (comparison keyword) which has not received the following processing (Steps S303 to S305) (Step S302).

Next, the related segment calculating unit 106 determines whether or not the new keyword candidate and the comparison keyword respectively obtained in the Steps S301 and S302 partially match each other (Step S303). It is noted that the partially matching denotes matching of 80 percent or more of letters in a keyword having four letters or more.

When the new keyword candidate and the comparison keyword partially match (Step S303: Yes), the related segment calculating unit 106 determines that the new keyword candidate is not the new keyword (Step S308). When the new keyword candidate and the comparison keyword do not partially match, meanwhile (Step S303: No), the related segment calculating unit 106 determines whether or not the new keyword candidate and the comparison keyword synonymously match (Step S304). It is noted that the synonymously matching denotes matching of a synonym of the new keyword candidate and the comparison keyword.

When the new keyword candidate and the comparison keyword synonymously match (Step S304: Yes), the related segment calculating unit 106 determines that the new keyword candidate is not a new keyword (Step S308). Meanwhile, when the new keyword candidate and the comparison keyword do not synonymously match (Step S304: No), the related segment calculating unit 106 determines whether or not the new keyword candidate and the comparison keyword make a fluctuation-of-description match (Step S305). It is noted that the fluctuation-of-description matching denotes that the comparison keyword matches with a keyword into which the new keyword candidate is replaced with a use of hiragana, katakana, a Chinese character, or a Roman alphabet.

When the new keyword candidate and the comparison keyword make the fluctuation-of-description match (Step S305: Yes), the related segment calculating unit 106 determines that the new keyword candidate is not a new keyword (Step S308). When the new keyword candidate and the comparison keyword do not make a fluctuation-of-description match, meanwhile (Step S305: No), the related segment calculating unit 106 determines whether or not all the keywords included in the keyword list of the previously-updated segment have been obtained (Step S306).

When not all the keywords included in the keyword list of the previously-updated segment have been obtained (Step S306:No), the processing is repeated from the keyword obtainment in the Step S302. Meanwhile, when all the keywords included in the keyword list of the previously-updated segment have been obtained (Step S306: Yes), the related segment calculating unit 106 determines the new keyword candidate as the new keyword (Step S307).

Next, the related segment calculating unit 106 determines whether or not all the keywords included in the keyword list of the additional content are obtained (Step S309). Here, when not all the keywords included in the keyword list of the additional content have been obtained (Step S309: No), the processing is repeated from the keyword obtainment in the Step S301. Meanwhile, when all the keywords included in the keyword list of the additional content have been obtained (Step S309: Yes), the related segment calculating unit 106 calculates the rate of change by dividing the number of keywords determined to be the new keyword in the Step S307 by the number of keywords included in the keyword list of the previously-updated segment (Step S310).

After the related segment is calculated by the related segment calculating unit 106 as described above, executed is the processing in the Step S107 shown in FIG. 5.

Described next with reference to FIGS. 8 to 10 are screens to be provided by the content searching device 100. FIGS. 8 to 10 show a transition of screens to be provided in searching content when the user desires to watch a news-related program out of available TV programs.

When starting the search, the content searching device 100 presents to the user an early stage searching screen shown in FIG. 8. The initial search keywords presented on the early stage searching screen include a keyword indicating a category, such as "sport" and "documentary". When the user desires to watch a news program out of the presented keywords, the user selects "news" out of the initial search keywords.

FIG. 9 shows a searching screen presented by the content searching device 100 after the user selects the initial search keyword. Presented on the searching screen are a content list 70 and a related keyword list 71 both of which relate to the selected keyword (news). It is noted that the related keyword 71 presents, for each related segment, related keywords in the order of having a higher degree of relevance.

When the user finds desired content on the searching screen, the user selects the content out of the content list 70. Meanwhile, when the user finds no content which the user desires to watch on the searching screen, the user selects a keyword, which relates to the desired content, out of the related keyword list 71.

When the user selects the content out of the content list 70 on the searching screen shown in FIG. 9, the content searching device 100 displays the selected content, and the search ends. Meanwhile, when the user selects any given related keyword out of the related keyword list 71, the content searching device 100 again presents, based on the selected keyword, a screen on which the content list and the related keyword are displayed. In the case where the user selects the Diet 72 out of the related keyword list 71 on the searching screen shown in FIG. 9, for example, the content searching device 100 presents, for each related segment, "the Diet"-related content and a "the Diet"-related keyword as shown in FIG. 10.

As described above, the user repeats selecting related keywords presented by the system to search the content which he or she desires to watch.

Next, processing of the content searching device 100 shown in FIGS. 5 and 6 shall be described in detail with reference to the drawings illustrated in FIGS. 8 to 10.

In the Step S101 in FIG. 5, the input unit 103 receives input information to the system entered by the user. Specifically, the input information is a keyword selected by the user including "news" on the early stage searching screen in FIG. 8 and "the Diet" on the searching screen in FIG. 9. In addition, also regarded as the input information is the content selected by the user out of the content list 70 shown in FIG. 9. Further, when the user selects the update of the content database, the selection is also the input information, which is not shown.

According to the embodiment, the content searching device 100 updates the content database 101 in receiving the user input. The content searching device 100 may update the content database 101 at any given time. Further, the content searching device 100 may also update the content database 101 when another device, instead of the content searching device 100, requests the content searching device to update the content database 101. Here, the input of the new content to the content database 101 is the input information.

In the Step S102 in FIG. 5, the input sorting unit 104 sorts the received input information forwarded from the Step S101 into any of "keyword selection", "content selection", or "content database update". Specifically, "keyword selection" is sorted out when the user selects any of the keyword out of the related keyword list 71 on the searching screen shown in FIG. 9, for example. Further, "content selection" is sorted out when the user selects any piece of content out of the content list 70 on the searching screen shown in FIG. 9, for example. In addition, "content database update", not shown, is sorted out when the user selects the update of the content database, for example.

In the Step S103 shown in FIG. 5, the input sorting unit 104 determines whether or not the selection performed in the Step S102 has been "keyword selection". In the case where the input sorting unit 104 determines that the information provided from the input unit 103 is "keyword selection", the input sorting unit 104 forwards an appropriate selected keyword to the attribute obtaining unit 108. Then, the processing proceeds to the Step S108. Meanwhile, in the case where the input sorting unit 104 determines that the information provided from the input unit 103 is not "keyword selection", the processing proceeds to the Step S104. Specifically, when the user selects either the keyword "news" on the early stage searching screen in FIG. 8, or the keyword "the Diet" on the searching screen in FIG. 9, the input sorting unit 104 sorts the either case as "keyword selection". Then, the input sorting unit 104 forwards the keyword "news", or "the Diet" to the attribute obtaining unit 108, following which the processing proceeds to the Step S108.

In the Step S104 shown in FIG. 5, the input sorting unit 104 determines whether or not the selection in the Step S102 is "content database update". Here, in the case where the input sorting unit 104 determines that the information provided from the input unit 103 is "content database update", the processing proceeds to the Step S105. Meanwhile, in the case where the input sorting unit 104 determines that the information provided from the input unit 103 is not "content database update"; that is the input sorting unit 104 determines in the Step S102 that the information provided from the input unit 103 is "content selection", the input sorting unit 104 obtains from the content database 101 a content ID corresponding to the content selected by the user. Then, the input sorting unit 104 forwards the obtained content ID to the output generating unit 110. The processing then proceeds to the Step S109. For example, when the user selects a TV program "Sunday Documentary" on the searching screen in FIG. 10, the input sorting unit 104 obtains from the content database 101 a content ID corresponding to the selected TV program, and forwards the obtained content ID to the output generating unit 110. The processing then proceeds to the Step S110. Meanwhile, in the case where the user has not selected a TV program; that is the user selects the content database update, the input sorting unit 104 forwards updated data to the content database update unit 105. Then, the processing proceeds to the Step S105.

In the Step S105 shown in FIG. 5, the content database updating unit 105 adds to the content database 101 the updated data obtained via the processing executed in the Step S104.

In the Step S106 shown in FIG. 5, the related segment calculating unit 106 calculates the related segment according to the updated data which has been newly added to the content database 101 by the content database updating unit 105 in the Step S105.

Detailed hereinafter is processing in the Step S106.

In the Step S201 shown in FIG. 6, the related segment calculating unit 106 obtains the previously-updated related segment included in the related word dictionary 102a for each content attribute, such as "news" and "sport". Specifically, the related segment calculating unit 106 obtains a most recent related segment 42 for each content attribute out of the data stored in the related word dictionary 102a shown in FIG. 4. As shown in FIG. 11(A), a related segment to be obtained here is referred to as a previously-updated segment 1001 (tn−2 to tn−1).

Next, in the Step S202 shown in FIG. 6, the related segment calculating unit 106 generates, for each content attribute, the keyword list of the content included in the related segment which has been obtained in the Step S201. Specifically, for example, the related segment calculating unit 106 refers to the related word dictionary 102a shown in FIG. 4 to obtain, for each content attribute, the keyword 43 corresponding to the previously-updated segment 1001.

Next, in the Step S203 shown in FIG. 6, the related segment calculating unit 106 generates, for each content attribute, the keyword list corresponding to the updated data obtained in the Step S104 shown in FIG. 5.

As described above, the processing from the Steps S201 to S203 shown in FIG. 6 involves generating, for each content attribute, the keyword list of the previously-updated segment and the keyword list corresponding to the content to be newly updated.

Next, in the Step S204 shown in FIG. 6, the related segment calculating unit 106 compares the keyword list generated in the Step S202 with the keyword list generated in the Step S203 to calculate a rate of change in the keyword line-up. Here, the rate of change in the keyword line-up represents an example of the degree of difference. Specifically, the rate of change of the keyword line-up is a value calculated, out of keywords of the content to be newly updated, by dividing the number of keywords which are not included in the keyword list of the previously-updated segment 1001 by the number of keywords which are included in the keyword list of the previously-updated segment 1001. For example, assume the case where the keyword list, which is i) generated in the Step S203 and ii) to be obtained from the content to be newly updated, includes: 40 new keywords which are not included in the keyword list of the previously-updated segment 1001; and 200 keywords included in the keyword list of the previously-updated segment 1001. Here, 0.2 is the rate of change in the keyword line-up. The number of new keywords is calculated according to the processing shown in FIG. 7.

Next, in the Step S205 shown in FIG. 6, the related segment calculating unit 106 determines whether or not the rate of change in the keyword line-up calculated in the Step S204 exceeds a predetermined threshold value. When determining in the Step S205 shown in FIG. 6 that the rate of change is equal to the predetermined threshold value or greater, the related segment calculating unit 106 calculates, in the Step S206 shown in FIG. 6, only a time segment corresponding to the additional content as a new related segment.

Meanwhile, when determining in the Step S205 shown in FIG. 6 that the rate of change is below the predetermined threshold value, the related segment calculating unit 106 calculates, in the Step S206 shown in FIG. 6, a time segment as the new related segment, the time segment which represents the sum of the previously-updated segment and a time segment corresponding to the content to be newly updated.

Specifically assumed is the case where the time segment corresponding to the content to be newly updated represents an additional segment 1002 (tn−1 to tn). When the rate of change in the keyword line-up is equal to the threshold value or greater, the related segment calculating unit 106 calculates, as shown in FIG. 11(B), a new related segment 1003 (tn−1 to tn) as the new related segment, the new related segment 1003 which is equivalent to the additional segment 1002. When the rate of change of the keyword line-up is below the threshold value, the related segment calculating unit 106 calculates, as shown in FIG. 11(C), a new related segment 1004 (tn−2 to tn) as the new related segment, the new related segment 1004 which represents the sum of the previously-updated segment 1001 and the additional segment 1002.

It is noted that typical frequency to observe a greater rate of change in the keyword line-up is significantly different for each content attribute. For example, topical content, such as "news", involves daily offering a new topic. Thus, the time interval of the topical content becomes shorter in observing a greater rate of change in the keyword line-up. Compared with the time interval of "news", meanwhile, a time interval of content, such as "variety" and "sport", becomes longer in observing a greater rate of change in the keyword line-up. This is because sport-related content significantly changes for each season, and variety-related content is re-streamlined for every three months. The change of the keyword line-up leads to the change of the degree of relevance between keywords. Thus, in order to present a topical keyword, the content searching device 100 desirably generates the related keyword, using the related word dictionary 102*a* with the related segment changed in conformity with the change of the keyword line-up. As described above, the related segment calculating unit 106 can calculate the related segment according to the rate of change in the keyword line-up for each content attribute, which allows the content searching device 100 to present a topical keyword.

By executing the processing from the Steps S201 to S207 shown in FIG. 6, the related segment calculating unit 106 can calculate, in the Step S106 shown in FIG. 5, the related segment, of the related word dictionary 102*a*, corresponding to the content which is to be newly added to the content database 101.

It is noted that the above description on the Step S204 shown in FIG. 6 does not in particular define the number of the keywords included in the two keyword list to be compared. Here, the rate of change may be calculated only out of the predetermined number of keywords which have great appearance frequency. Specifically, the related segment calculating unit 106: compares (i) the top "n" keywords having higher appearance frequency in the keyword list generated in the Step S202 and (ii) the top "n" keywords having great appearance frequency in the keyword list generated in the Step S203; and calculate the rate of change in the keyword line-up. For example, assume the case of the top 100 keywords having great appearance frequency in the keyword list generated in the Step S203. When there are 40 new keywords, which are not included in the top 100 keywords having great appearance frequency, in the keyword list of the previously-updated segment, 0.4 is the rate of change in the keyword line-up.

Figure 12:
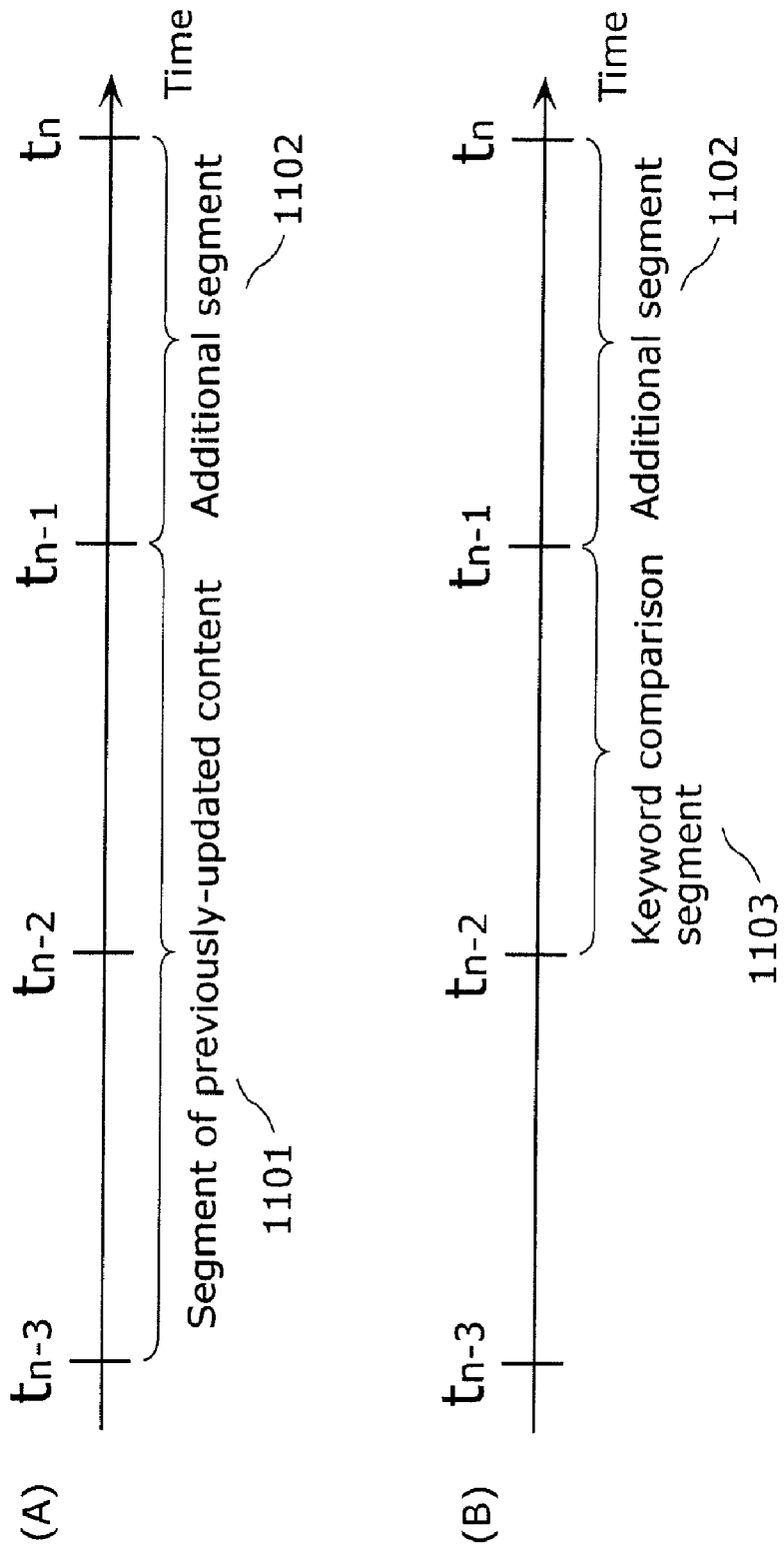
[FIG. 12]

In the Step S201 shown in FIG. 6 described above, moreover, the related segment calculating unit 106 obtains, as the previously-updated segment, the most recent related segment in the related word dictionary 102*a*. Meanwhile, obtained as the previously-updated segment may be a predetermined length of time segment included in the time segment corresponding to the content previously updated in the content database 101. Specifically, in the case of FIG. 12(A), the related segment calculating unit 106 obtains a keyword comparison segment 1103 (tn−2 to tn−1) shown in FIG. 12(B). In other words, when a segment of previously updated content 1101 (tn−3 to tn−1), which represents the time segment corresponding to the content previously updated in the content database 101, is twice as long as a shortest time unit, the related segment calculating unit 106 obtains a time segment, which is as long as the shortest time unit and is closer to an additional segment 1102, out of the segment of previously updated content.

Comparison of the rates of change for each shortest time unit makes possible setting a related segment which conforms to a fine change of the degree of relevance of a keyword. When searching content having relatively great frequency in change of the content description, such as a Weblog (blog), the content searching device can always present a new related keyword.

Next, in the Step S107 shown in FIG. 5, the dictionary updating unit 107 updates a related word dictionary according to the related segment calculated in the Step S105. The dictionary shall be generated as shown in FIG. 1.

In the Step S108 shown in FIG. 5, the attribute obtaining unit 108 determines the content attribute of the keyword obtained in the Step S103. Then, the attribute obtaining unit 108 forwards the keyword and the determined content attribute to the related keyword obtaining unit 109. The processing then proceeds to the Step S109. Assume the case where the keywords presented on the early stage searching screen shown in FIG. 8 are the keywords which are common to the content attribute. Here, a specific example for determining the content attribute may involve the attribute obtaining unit 108 determining, as the content attribute, a keyword selected by the user on the early stage searching screen. In the case where the user selects "news" on the early stage searching screen shown in FIG. 8, the attribute obtaining unit 108 determines that the content attribute of the related keyword selected by the user is "news", as shown on the searching screen illustrated in FIG. 9. As a result, a narrowing-down search is effectively performed, which narrows down pieces of content in the content attribute "sport" selected in the beginning.

In the Step S109 shown in FIG. 5, the related keyword obtaining unit 109 refers to the dictionary database 102 to obtain the keyword obtained in the Step S103 and the related keyword corresponding to the keyword attribute obtained in the Step S108. Then, the related keyword obtaining unit 109 forwards the obtained related keyword to the output generating unit 110, following which the processing proceeds to the Step S110. Specifically, in the case where the user selects "news" on the early stage searching screen shown in FIG. 8, and then "the Diet" on the searching screen shown in FIG. 9, the attribute obtaining unit 108 determines that the keyword attribute is "news". Next, the related keyword obtaining unit 109 refers to the related word dictionary 102*a* shown in FIG. 4 to obtain a great keyword in value of the degree of relevance 45 out of the related keywords corresponding to the content attribute "news" and the keyword "the Diet". In the related segment Sep. 10 through 12, 2007, for example, the related keyword obtaining unit 109 obtains keywords; namely, "Prime Minister's speech", "politics", and "pension".

When the related keyword is obtained in the Step S109, the Step S110 shown in FIG. 5 involves the output generating unit 110 using the obtained related keyword and the content database 101 to generate, for example, output information for outputting the searching screen illustrated in FIG. 9. Meanwhile, when the content ID is obtained in the Step S104, the output generating unit 110 uses the obtained content ID and the content database 101 to generate output information for displaying the content.

In the Step S111 shown in FIG. 5, the output unit 111 outputs to a monitor the output information generated in the Step S110.

Executing the processing from the Steps S101 to S111 described above, the content searching device 100 can refer to the related word dictionary 102*a* whose related segment is different for each content attribute. This allows the content searching device 100 to present to the user a different topical related keyword for each content attribute.

It is noted in the Step S108 shown in FIG. 5 that the attribute obtaining unit 108 may utilize a technique different from the one described above in order to obtain the content attribute. Out of content attributes in which the obtained keyword is found, for example, the attribute obtaining unit 108 may obtain two or more content attributes having high appearance frequency of the keyword. Assume the case where the keyword "the Diet" is found in two of the content attributes "news" and "variety", for example. When the order of appearance frequency of the keyword "the Diet" is equal to a predetermined threshold or greater out of each of the content attributes, the attribute obtaining unit 108 may obtain the two content attributes as keyword attributes. FIG. 13 exemplifies a screen to be provided in this case. As shown in FIG. 13, the output unit 111 outputs the related keyword, which corresponds to the keyword "the Diet", to each of the content attributes "news" and "variety". This allows the user to select the related keyword according to each content attribute. Thus, the content searching device 100 can avoid presenting a related keyword which is undesired by the user (for example, the case where a related keyword of news is presented instead of a related keyword of variety which the user has desired). As a result, the content searching device 100 makes possible reducing searching repetitions executed by the user.

FIG. 14 arranges to show an example of presenting i) related keywords provided by the content searching device in accordance with the embodiment, and ii) related keywords provided with a use of a fixed segment in accordance with a conventional technique described in Patent Reference 2.

FIG. 14(A) exemplifies a presenting screen for the related keywords provided by the content searching device in accordance with the conventional technique. As shown in FIG. 14(A), each of keywords is generated according to one of associated time segments 121, 122, and 123. Each of the time segments 121, 122, and 123 includes, for 10 days each, data between Aug. 13, 2007 and Sep. 12, 2007.

FIG. 14(B) exemplifies a presenting screen for the related keywords provided by the content searching device 100 in accordance with the embodiment. As shown in FIG. 14(B), each of related keywords is generated according to one of associated time segments 124, 125, and 126. Each of the time segments 124, 125, and 126 is calculated based on a rate of change in the keyword line-up for each attribute.

When the time segment for generating the related keyword is short with respect to frequency of a change of the data details, (when no change in the keyword line-up is observed for 20 days, for example), the content searching device in accordance with the conventional technique ends up presenting the same keyword over plural time segments as "election" is shown in the time segment 121 and the time segment 122 in FIG. 14(A). Providing the same keyword plural times on the same screen leads to fewer options for the user. As a result, an extra search step may likely be developed when the user desires to select another keyword.

Meanwhile, the content searching device 100 in accordance with the embodiment determines the time segment for generating the related keywords according to a change of the keyword line-up for each content attribute. Thus, the content searching device 100 is less likely to provide the same keyword plural times to a different time segment. In other words, according to the time segment 124 shown in FIG. 14(B), one time segment is small in change of the keyword line-up; namely, the time segment 124. As a result, the keywords presented in the time segment 124 are different from the keywords presented in the time segment 125 provided next to the time segment 124.

When the time segment for generating the related keyword is long with respect to frequency of a change of the data details, (when a change in the keyword line-up is observed for every five days, for example), the content searching device in accordance with the conventional technique ends up preferentially presenting a keyword having a high degree of relevance, beginning on or about a period in which the keyword line-up changes. Thus, the content searching device in accordance with the conventional technique cannot present a topical keyword. In other words, as shown in the time segment 123 in FIG. 14(A), a keyword "America", which has had a high degree of relevance before the change in the keyword line-up, is presented higher than a keyword "Prime Minister's speech" which is topically acceptable after the change in the keyword line-up. As described above, this is likely to end up having more search steps when the user desires to select another keyword.

Meanwhile, the content searching device 100 in accordance with the embodiment changes a time segment used for generating the related keyword, for each content attribute, according to the rate of change in the keyword line-up. Thus, the content searching device 100 can present a topical related keyword. In other words, as shown in the time segment 125 and the time segment 126 in FIG. 14(B), the content searching device 100 can change the time segment of Sep. 10, 2007 which saw a significant change in the keyword line-up. Thus, the content searching device 100 can present, to the latest time segment 126, the topical keyword "Prime Minister's speech".

As described above, the content searching device in accordance with the embodiment updates a related word dictionary for generating a related keyword in accordance with a related segment based on a degree of difference between content to be newly added and already stored content in keyword line-up. Thus, the content searching device in accordance with the embodiment can efficiently present to the user a topical related keyword. This allows the user to interactively narrow down content by repeating the selection of the related keyword in searching the content from a content database including pieces of content having topically different plural content attributes.

(Modification 1)

Described next is Modification 1 according to the embodiment, with reference to the drawings.

The content searching device in accordance with Modification 1 is different from the content searching device 100, in accordance with the embodiment, shown in FIG. 1 in that the content database updating unit 105 generates the content attribute 21.

Described hereinafter is processing regarding generation of the content attribute 21 performed by the content database updating unit 105 in accordance with Modification 1.

The content database updating unit 105 in accordance with Modification 1 clusters pieces of content stored in the content database 101 to generate a "cluster label" as the content attribute 21. Then, the content database updating unit 105 registers the generated content attribute 21 in the content database 101. The clustering performed by the content database updating unit 105 as described above allows the content searching device to classify pieces of content, which are closely related in program detail, into the same group, the pieces of content which represent either a cluster (a content group) including sport programs, or a cluster including movie programs. In other words, the "cluster label", an example of the content attribute 21, is information equivalent to "category" in the EPG. As a specific clustering technique executed by the content database updating unit 105, utilized may be a rearrangement technique described in Non-Patent Reference 2 "Information Retrieval and Language Processing" (Takenobu TOKUNAGA, University of Tokyo Press, pp. 60-65, 1999).

Figure 15:
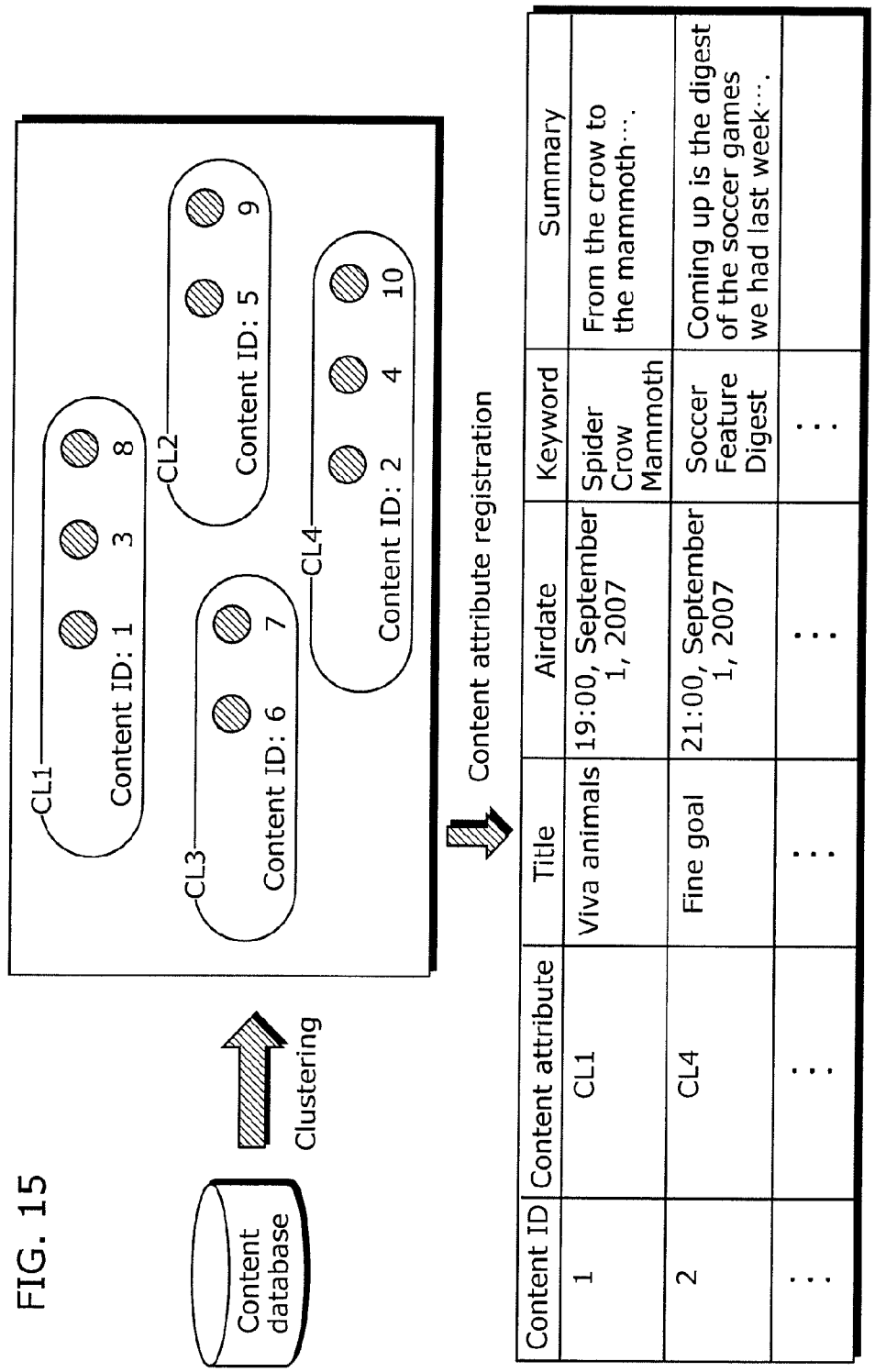
[FIG. 15]

FIG. 15 shows a conceptual diagram of processing involving the content database updating unit 105 generating the cluster label as the content attribute 21. As shown in FIG. 15, the content database updating unit 105 performs clustering to generate plural clusters with a use of a keyword included in the attached information to content stored in the content database 101. Then, the content database updating unit 105 generates cluster labels corresponding to the generated clusters.

For example, the content database updating unit 105 assigns to clusters the cluster labels (CL1 to CL4) generated at random. This intends to generate at least one cluster label for all the content IDs stored in the content database 101. Then, the content database updating unit 105 registers, in the content database 101, the generated cluster labels as the content attribute 21.

Through the above processing, the content database updating unit 105 can automatically register the content attribute 21 equivalent to "category" of the EPG. This enables the content searching device in accordance with Modification 1 to provide a related keyword out of the content database 101 with no content attribute previously registered in.

Figure 16:
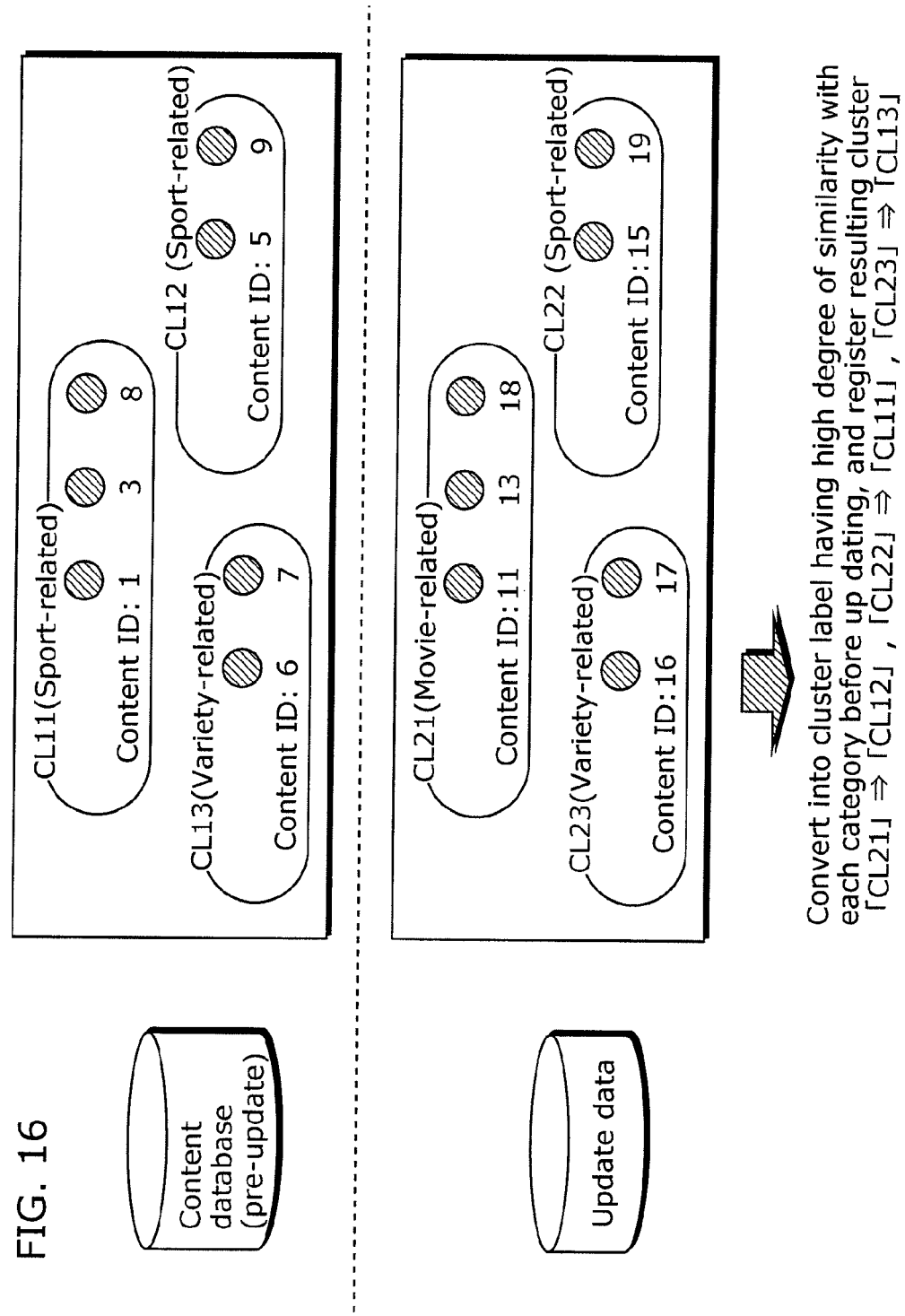
[FIG. 16]

It is noted that the content database updating unit 105 generates for each database update the cluster label with respect a piece of update data stored in the content database 101. With regard to clusters sharing the same details, as shown in FIG. 16, cluster labels (CLs 21 to 23) to pieces of updated data are likely to be different from cluster labels (CLs 11 to 13) to pieces of pre-update data having already been stored in the content database 101. For example, a cluster label "CL11" is assigned to a pre-update and sport-related cluster; however, a cluster label "CL22" is assigned to a sport-related cluster in the updated data. In other words, the same label is not assigned to the clusters sharing the same details. In this case, the content database updating unit 105 first calculates a degree of similarity between each cluster in the updated data and a corresponding cluster included in the pre-update data. Next, the content database updating unit 105 groups clusters sharing a high degree of similarity into a pair. Then, the content database updating unit 105 assigns the pre-update cluster label to the grouped pair as a cluster label in the updated data. It is noted that the degree of similarity may be calculated with a use of a method utilizing a cosine scale or an inner product between each of clusters (Non-Patent Reference 3: "Information Retrieval Algorithm". Kenji KITA. Kyoritsu Shuppan Co., Ltd. pp. 60-63, 2002). This enables the content database updating unit 105 to assign the same cluster label to the clusters sharing similar details around the update, so that the above-exemplified cluster labels are converted from "CL22" to "CL11".

(Modification 2)

Described next is Modification 2 according to the embodiment, with reference to the drawings.

A content searching device in accordance with Modification 2 is different from the content searching device 100 in accordance with the embodiment in detail of the processing executed by the related segment calculating unit 106. When a related segment is calculated in the content database 101 having significant difference in number of keywords among pieces of content, the calculated related segment is largely influenced by content having a large number of keywords. Thus, in the Step S106 shown in FIG. 5, the related segment calculating unit 106 in accordance with Modification 2 calculates a related segment with a use of a degree of similarity, of a document space, between pre-update content having already been stored in the content database 101 and additional content to be newly added to the content database 101.

Described hereinafter is processing on calculation of the related segment performed by the related segment calculating unit 106 in accordance with Modification 2.

Figure 17:
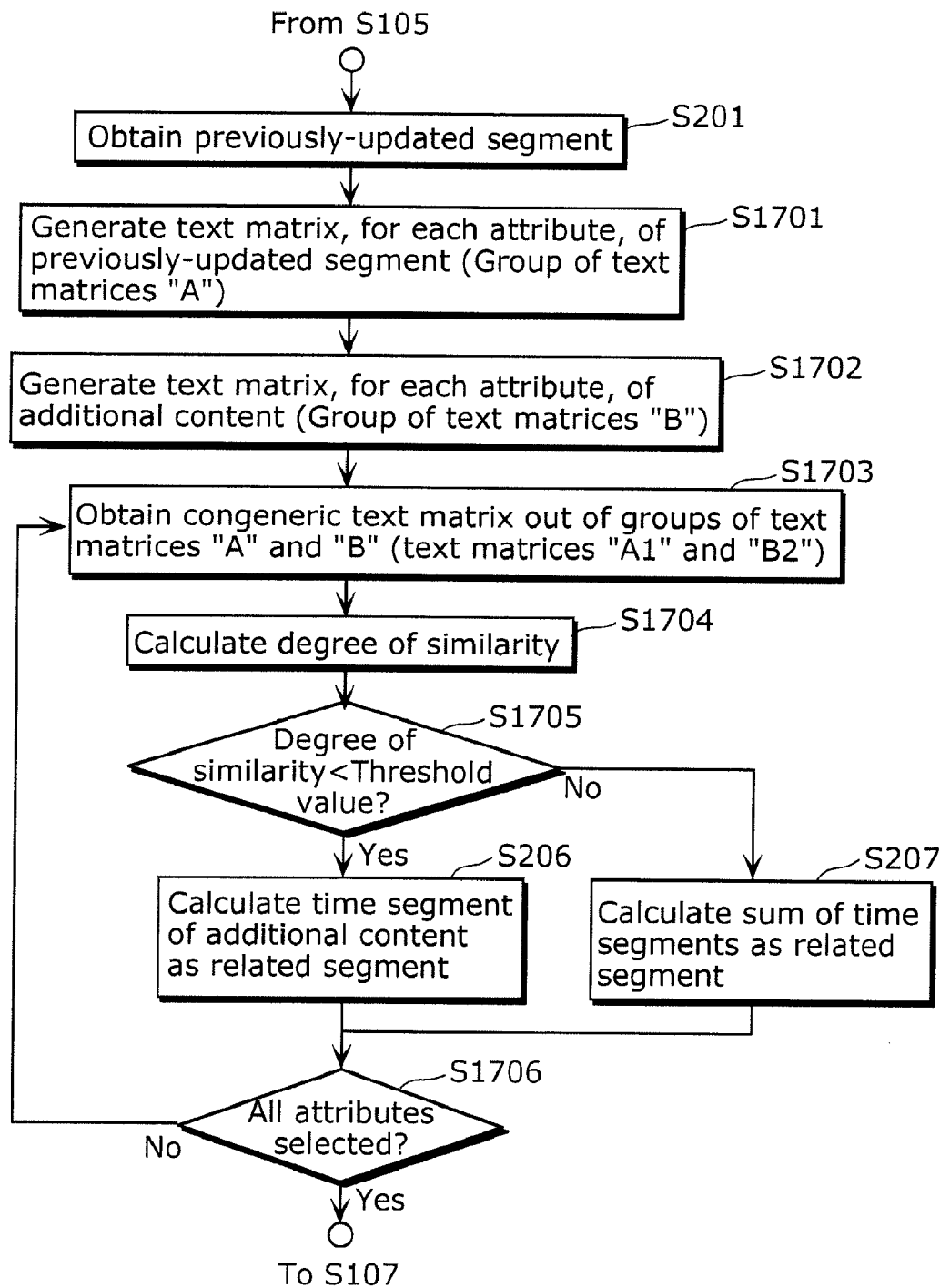
[FIG. 17]

FIG. 17 is a flowchart illustrating a flow of processing (Step 106 shown in FIG. 5) on calculation of the related segment performed by the related segment calculating unit 106. In FIG. 17, steps similar to ones in FIG. 6 share the same numerals therein, and the detailed descriptions thereof shall be omitted.

First, the related segment calculating unit 106 obtains for each content attribute the previously-updated related segment (Step S201).

Next, the related segment calculating unit 106 generates for each content attribute a text matrix of content of the obtained previously-updated segment (Step S1701). In other words, the related segment calculating unit 106 generates the text matrix for each content attribute with a use of plural second keywords describing second content having already been stored in the content database. Hereinafter, the generated text matrix is referred to as a group of text matrices "A". Here, the text matrix represents frequency information (appearance frequency tf–idf) of a keyword in each piece of content, as shown in FIG. 18.

Next, the related segment calculating unit 106 generates for each content attribute the text matrix of content newly added to the content database 101 (Step S1702). In other words, the related segment calculating unit 106 generates the text matrix for each content attribute with a use of plural first keywords describing first content to be newly stored in the content database. Hereinafter the generated text matrix is referred to as a group of text matrices "B".

Figure 19:
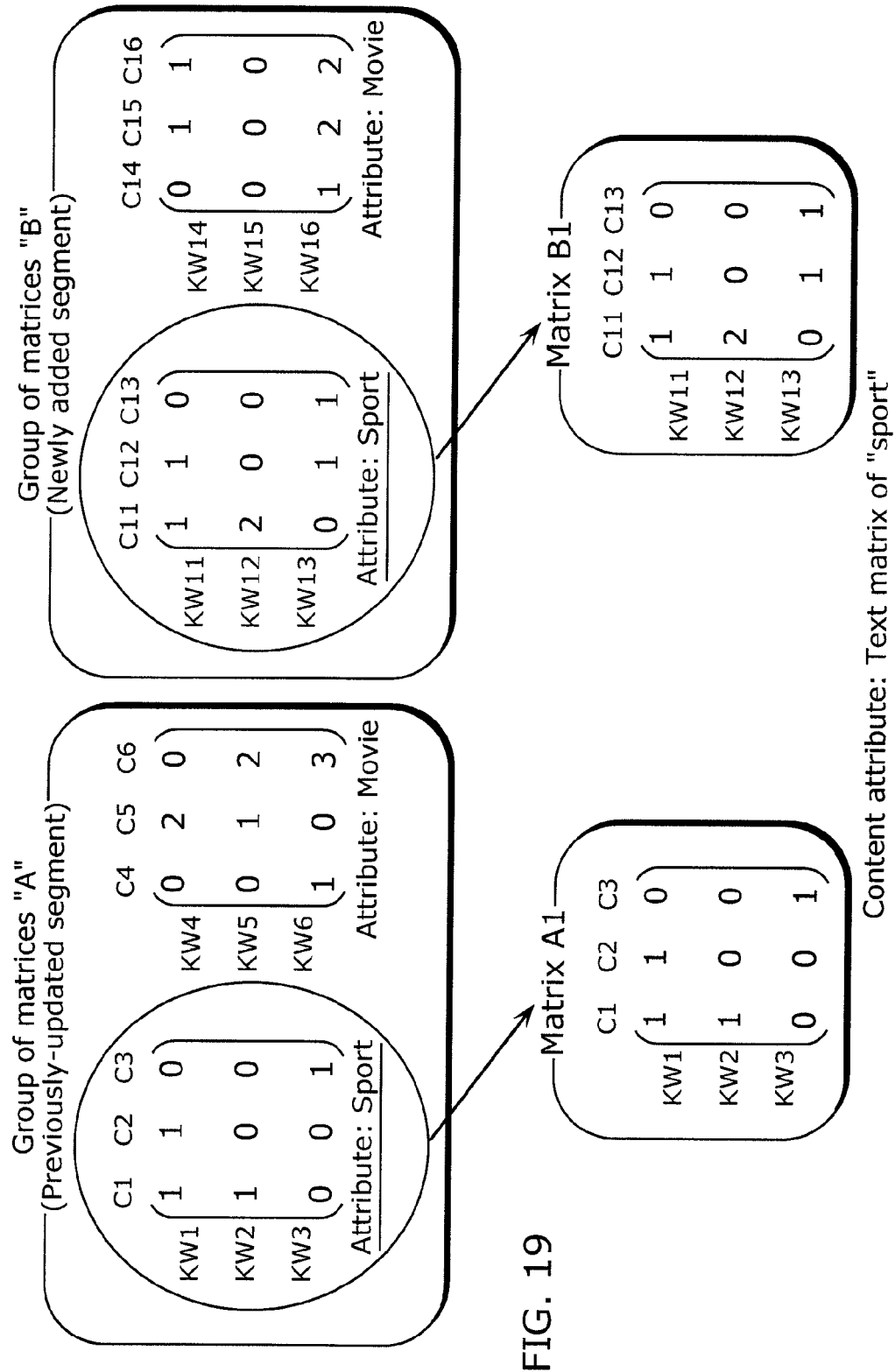
[FIG. 19]

Then, the related segment calculating unit 106 obtains a text matrix sharing the same content attribute out of each of the groups of text matrices "A" and "B". Hereinafter, each of text matrices obtained from the groups of text matrices "A" and "B" is referred to as text matrices "A1" and "B1", respectively. FIG. 19 exemplifies the text matrices "A1" and "B1" obtained in the Step S1703. As shown in FIG. 19, each of the groups of text matrices "A" and "B" includes text matrices whose content attributes are "sport" and "movie". Thus, the Step S1703 involves selecting the text matrix whose content attribute is "sport" out of each of the groups of text matrices "A" and "B", so that obtained are the text matrices "A1" and "B1" corresponding to the content attribute "sport".

Next, the related segment calculating unit 106 uses the text matrices "A1" and "B1" to calculate a degree of similarity for each text matrix (Step S1704). For example, the related segment calculating unit 106 calculates cosine distance of each document vector of the text matrix "B1" with respect to the text matrix "A1" to obtain as the degree of similarity the ratio of documents, having equal to a threshold value or greater in cosine distance, to be included with respect to all the number of the documents in the text matrix "B1".

Here, in the case where the calculated degree of similarity is smaller than a predetermined threshold (Step S1705: Yes), the related segment calculating unit 106 calculates as a new related segment a time segment corresponding to the content (first content) newly added to the content database 101 (Step S206). Meanwhile, in the case where the calculated degree of similarity is equal to the predetermined threshold value of greater (Step S1705: No), the related segment calculating unit 106 calculates as a new related segment a time segment which is the sum of (i) the time segment corresponding to the content newly added to the content database 101, and (ii) the previously-updated segment (Step S207). In other words, the related segment calculating unit 106 calculates as the new related segment the time segment which is the sum of the time segment corresponding to the first content and the time segment corresponding to the second content.

Next, the related segment calculating unit 106 determines whether or not all the content attributes stored in the content database 101 are selected (Step S1706). In the case where all the content attributes are not selected (Step S1706: No), the process goes back to the Step S1703. Meanwhile, in the case where all the content attributes are selected (Step S1706: Yes), executed is the processing in the Step S107 shown in FIG. 5.

Through the processing executed in the Steps S201, S206, S207, and S1701 to S1706, the related segment calculating unit 106 can calculate a related segment which is based on a degree of similarity for each piece of content. This can prevent miscalculation of a related segment since an effect of content having a large number of keywords is curbed in calculating the related segment even in the case where the related segment is calculated in the content database 101 whose pieces of content are significantly different each other in number of keywords.

In the Step S106, the related segment calculating unit 106 may calculate the related segment according to the fact whether or not a degree of difference, between content titles of the pre-update content and the additional content, meets a predetermined reference value. Specifically, the related segment calculating unit 106 calculates a concordance rate between content titles of the content in the previously-updated segment and the newly added content. In the case where the concordance rate is equal to a threshold value or greater, the related segment calculating unit 106 calculates as a new related segment a time segment which is the sum of the previously-updated segment and the time segment corresponding to the content newly added to the content database 101. In the case where the concordance rate is smaller than the threshold value, meanwhile, the related segment calculating unit 106 calculates as the new related segment a time segment corresponding to the content newly added to the content database 101. This allows the related segment calculating unit 106 to significantly reduce a processing time for calculating the related segment in the content database 101 storing pieces of content having similar description in the case where the pieces of content share the same title.

Described above is the content searching device in accordance with the embodiment and Modifications of the present invention; however, the present invention shall not be limited to the above embodiment and Modifications thereof. Although only an exemplary embodiment of this invention has been described in detail above, those skilled in the art will readily appreciate that many modifications are possible in the exemplary embodiment without materially departing from the novel teachings and advantages of this invention. Accordingly, all such examples are intended to be included within the scope of this invention.

In the embodiment, for example, the content searching device includes the content database; meanwhile, a device other than the content searching device may include the content database. Here, the content searching device and the device are connected via a network.

In addition, the content searching device of the above embodiment searches a desired TV program by the user out of the content database storing TV programs; meanwhile, the content searching device may search content from a content database storing: audio content, such as a movie and music; and text content, such as a book and a paper. In other words, the content searched by the content searching device in accordance with the present invention may be content having character information.

It is noted that the present invention can also be realized as a content searching method which regards, as steps, operations of the characteristic structural units included in the content searching device, and a program which causes a computer to execute characteristics steps included in the content searching method, as well as the content searching device described above. Such a program can be distributed via: a storing medium, such as a Compact Disc-Read only Memory (CD-ROM); and a communications network, such as the Internet.

INDUSTRIAL APPLICABILITY

The present invention is available as a content searching device for searching content, which a user desires to use, out of a large number of pieces of content. In particular, the present invention is available as a device for searching a TV program of the user's desire out of a database storing a large number of TV programs.

The invention claimed is:

1. A content searching device which searches content from a content database with a use of a related keyword which is related to a keyword describing content, the content database storing the content for each content attribute showing a classification of the content, and said content searching device comprising:

a dictionary database which stores a degree of relevance, among a plurality of keywords, for each related segment indicating a time segment, the plurality of keywords each describing the content which (i) belongs to the classification indicated by the content attribute, and (ii) is included in the related segment;

a related segment calculating unit configured to calculate, for each content attribute, a related segment which is defined in order for first content and second content to be included in a same time segment, the related segment being calculated based on whether or not a degree of difference, for each content attribute, calculated out of a plurality of first keywords and a plurality of second keywords meets a predetermined reference value, and the plurality of the first keywords each describing the first content to be stored in said database, and the plurality of the second keywords each describing the second content having been stored in said content database;

a dictionary updating unit configured to update the degree of relevance, stored in said dictionary database, regarding the content included in the related segment calculated by said related segment calculating unit, the degree of relevance being updated with a use of the related segment, and the degree of relevance, among the plurality of keywords, being calculated for each content attribute; and an output generating unit configured to generate output information used for outputting, for each related segment, the related keyword relating to a keyword entered by a user, the output information being generated based on the degree of relevance stored in said dictionary database, wherein said related segment calculating unit is configured to calculate (i) a related segment defined by a time segment corresponding to the first content in the case where the degree of difference exceeds the predetermined reference value, and (ii) a related segment defined by a time segment which is a sum of a latest related segment stored in said dictionary database and the time segment corresponding to the first content in the case where the degree of difference is equal to the predetermined reference value or below.

2. The content searching device according to claim 1, wherein said related segment calculating unit is configured to calculate the related segment, regarding content included in the latest related segment stored in said dictionary database as the second content.

3. The content searching device according to claim 2, wherein said related segment calculating unit is configured to calculate the related segment according to whether or not a degree of difference meets the predetermined reference value, the degree of difference being calculated between (i) a predetermined number of keywords having high appearance frequency out of the plurality of the first keywords, and (ii) a predetermined number of keywords having high appearance frequency out of the plurality of the second keywords.

4. The content searching device according to claim 1, wherein said related segment calculating unit is configured to calculate the related segment, regarding content included in a time segment in a predetermined time length as the second content, the time segment being included in time segments corresponding to content newly and previously added to the content database.

5. The content searching device according to claim 1, further comprising:
an attribute obtaining unit configured to obtain a content attribute which relates to the keyword entered by the user; and
a related keyword obtaining unit configured to obtain, for each related segment, a related keyword with reference to said dictionary database, the related keyword corresponding to the keyword entered by the user and to the content attribute obtained by said attribute obtaining unit,
wherein said output generating unit is configured to generate the output information used for outputting the related keyword obtained by said related keyword obtaining unit.

6. The content searching device according to claim 5, wherein, in the case where said attribute obtaining unit obtains a plurality of content attributes, said related keyword obtaining unit is configured to generate the related keyword for each of the plurality of the content attributes, and
said output generating unit is configured to generate the output information used for outputting the related keyword generated for each of the plurality of content attributes, the output information being used for outputting the related keyword for each content attribute and for each related segment.

7. The content searching device according to claim 1, wherein said related segment calculating unit is configured to calculate the related segment according to whether or not a degree of difference meets a predetermined reference value, the degree of difference representing a value where the number of keywords, out of the plurality of the first keywords, which do not overlap with the plurality of the second keywords is divided by the number of the plurality of the second keywords.

8. A content searching method for allowing a computer to search content from a content database with a use of a related keyword which is related to a keyword describing content, the content database storing the content for each content attribute showing a classification of the content,
wherein the computer includes
a dictionary database which stores a degree of relevance, among a plurality of keywords, for each related segment indicating a time segment, the plurality of keywords each describing the content which (i) belongs to a classification indicated by the content attribute, and (ii) is included in the related segment, and
said content searching method comprises:
calculating by the computer, for each content attribute, a related segment which is defined in order for first content and second content to be included in a same time segment, the related segment being calculated based on whether or not a degree of difference, for each content attribute, calculated out of a plurality of first keywords and a plurality of second keywords meets a predetermined reference value, the plurality of the first keywords each describing the first content to be stored in the content database, and the plurality of the second keywords each describing the second content having been stored in the content database;
updating by the computer the degree of relevance, stored in the dictionary database, regarding the content included in the related segment calculated in said calculating, the degree of relevance being updated with a use of the related segment, and the degree of relevance, among the plurality of keywords, being calculated for each content attribute; and
generating by the computer output information used for outputting, for each related segment, the related keyword relating to a keyword entered by a user, the output information being generated based on the degree of relevance stored in the dictionary database,
wherein said calculating comprises calculating (i) a related segment defined by a time segment corresponding to the first content in the case where the degree of difference exceeds the predetermined reference value, and (ii) a related segment defined by a time segment which is a sum of a latest related segment stored in the dictionary database and the time segment corresponding to the first content in the case where the degree of difference is equal to the predetermined reference value or below.

9. A non-transitory computer-readable medium having a computer executable program stored thereon for causing a computer to search content from a content database with a use of a related keyword which is related to a keyword describing content, the content database storing the content for each content attribute showing a classification of the content,
wherein the computer includes
a dictionary database which stores a degree of relevance, among a plurality of keywords, for each related segment indicating a time segment, the plurality of keywords each describing the content which (i) belongs to a classification indicated by the content attribute, and (ii) is included in the related segment, and
said program causes the computer to execute a method comprising:
calculating, for each content attribute, a related segment which is defined in order for first content and second content to be included in a same time segment, the related segment being calculated based on whether or not a degree of difference, for each content attribute, calculated out of a plurality of first keywords and a plurality of second keywords meets a predetermined reference value, the plurality of the first keywords each describing the first content to be stored in the content database, and the plurality of the second keywords each describing the second content having been stored in the content database;
updating the degree of relevance, stored in the dictionary database, regarding the content included in the related segment calculated in said calculating, the degree of relevance being updated with a use of the related segment, and the degree of relevance, among the plurality of keywords, being calculated for each content attribute; and
generating output information used for outputting, for each related segment, the related keyword relating to a keyword entered by a user, the output information being generated based on the degree of relevance stored in the dictionary database, wherein said calculating comprises calculating (i) a related segment defined by a time segment corresponding to the first content in the case where the degree of difference exceeds the predetermined reference value, and (ii) a related segment defined by a time segment which is a sum of a latest related segment stored in the dictionary database and the time segment corresponding to the first content in the case where the degree of difference is equal to the predetermined reference value or below.

10. An apparatus for renewing a content database with a use of a related keyword which is related to a keyword describing content, the content database storing the content for each content attribute showing a classification of the content, and said apparatus comprising:

a dictionary database which stores a degree of relevance, among a plurality of keywords, for each related segment indicating a time segment, the plurality of keywords each describing the content which (i) belongs to the classification indicated by the content attribute, and (ii) is included in the related segment;

a related segment calculating unit configured to calculate, for each content attribute, a related segment which is defined in order for first content and second content to be included in a same time segment, the related segment being calculated based on whether or not a degree of difference, for each content attribute, calculated out of a plurality of first keywords and a plurality of second keywords meets a predetermined reference value, the plurality of the first keywords each describing the first content to be stored in said content database, and the plurality of the second keywords each describing the second content having been stored in said content database; and a dictionary updating unit configured to update the degree of relevance, stored in said dictionary database, regarding the content included in the related segment calculated by said related segment calculating unit, the degree of relevance being updated with a use of the related segment, and the degree of relevance, among the plurality of keywords, being calculated for each content attribute, wherein said related segment calculating unit is configured to calculate (i) a related segment defined by a time segment corresponding to the first content in the case where the degree of difference exceeds the predetermined reference value, and (ii) a related segment defined by a time segment which is a sum of a latest related segment stored in said dictionary database and the time segment corresponding to the first content in the case where the degree of difference is equal to the predetermined reference value or below.

* * * * *